US012579205B2

(12) United States Patent
Zheng et al.

(10) Patent No.: US 12,579,205 B2
(45) Date of Patent: Mar. 17, 2026

(54) CONTENT RECOMMENDATION METHOD AND APPARATUS, DEVICE, MEDIUM, AND PROGRAM PRODUCT

(71) Applicant: Tencent Technology (Shenzhen) Company Limited, Shenzhen (CN)

(72) Inventors: Jiawei Zheng, Shenzhen (CN); Hao Gu, Shenzhen (CN); Lingling Yi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/939,506

(22) Filed: Nov. 6, 2024

(65) Prior Publication Data

US 2025/0061160 A1 Feb. 20, 2025

Related U.S. Application Data

(63) Continuation of application No. PCT/CN2023/118248, filed on Sep. 12, 2023.

(30) Foreign Application Priority Data

Nov. 29, 2022 (CN) .......................... 202211516062.9

(51) Int. Cl.
G06F 16/9535 (2019.01)
(52) U.S. Cl.
CPC ................................ G06F 16/9535 (2019.01)
(58) Field of Classification Search
CPC .................................................... G06F 16/9535
See application file for complete search history.

(56) References Cited

U.S. PATENT DOCUMENTS

| | | | | |
|---|---|---|---|---|
| 7,975,035 B2 * | 7/2011 | Popescu | ................ | H04L 69/329 |
| | | | | 709/200 |
| 2014/0282586 A1 * | 9/2014 | Shear | .................... | G06F 16/245 |
| | | | | 718/104 |
| 2015/0112918 A1 * | 4/2015 | Zheng | .................... | G06N 5/047 |
| | | | | 706/48 |
| 2015/0178282 A1 * | 6/2015 | Gorur | ................ | G06F 16/9535 |
| | | | | 707/748 |

(Continued)

FOREIGN PATENT DOCUMENTS

| | | | | | |
|---|---|---|---|---|---|
| CN | 112182131 A | * | 1/2021 | ......... | G06F 16/9536 |
| CN | 113068057 A | * | 7/2021 | ......... | H04N 21/4788 |

(Continued)

*Primary Examiner* — Mark E Hershley
(74) *Attorney, Agent, or Firm* — ARENTFOX SCHIFF LLP

(57) ABSTRACT

A content recommendation method is provided. A first feature representation of a first user and a second feature representation of a second user are obtained. A cluster center corresponding to the first user is determined. An extra-domain feature representation and intra-domain feature representation of the first user are obtained. The intra-domain feature representation is based on mapping the extra-domain feature representation with the mapping relationship function. A target feature representation of the first user is determined based on the intra-domain feature representation and the first feature representation. Target content that matches the target feature representation of the first user is determined. The target content is pushed to the first user.

20 Claims, 7 Drawing Sheets

(56)                    References Cited

U.S. PATENT DOCUMENTS

2016/0034305 A1* 2/2016 Shear ........................ G06F 9/50
                                                  707/722
2016/0148255 A1* 5/2016 Shariat ............... G06Q 30/0275
                                                  705/14.53
2017/0061286 A1* 3/2017 Kumar ............... G06Q 30/0269
2018/0174070 A1* 6/2018 Hoffman ................. G06N 7/01
2018/0350144 A1* 12/2018 Rathod .................. H04L 51/10
2021/0272217 A1* 9/2021 Shu .................... G06F 18/2136

FOREIGN PATENT DOCUMENTS

CN          114780867 A  *  7/2022  .......... G06F 16/367
WO     WO-2013138969 A1 *  9/2013  ............. G06Q 30/02

* cited by examiner

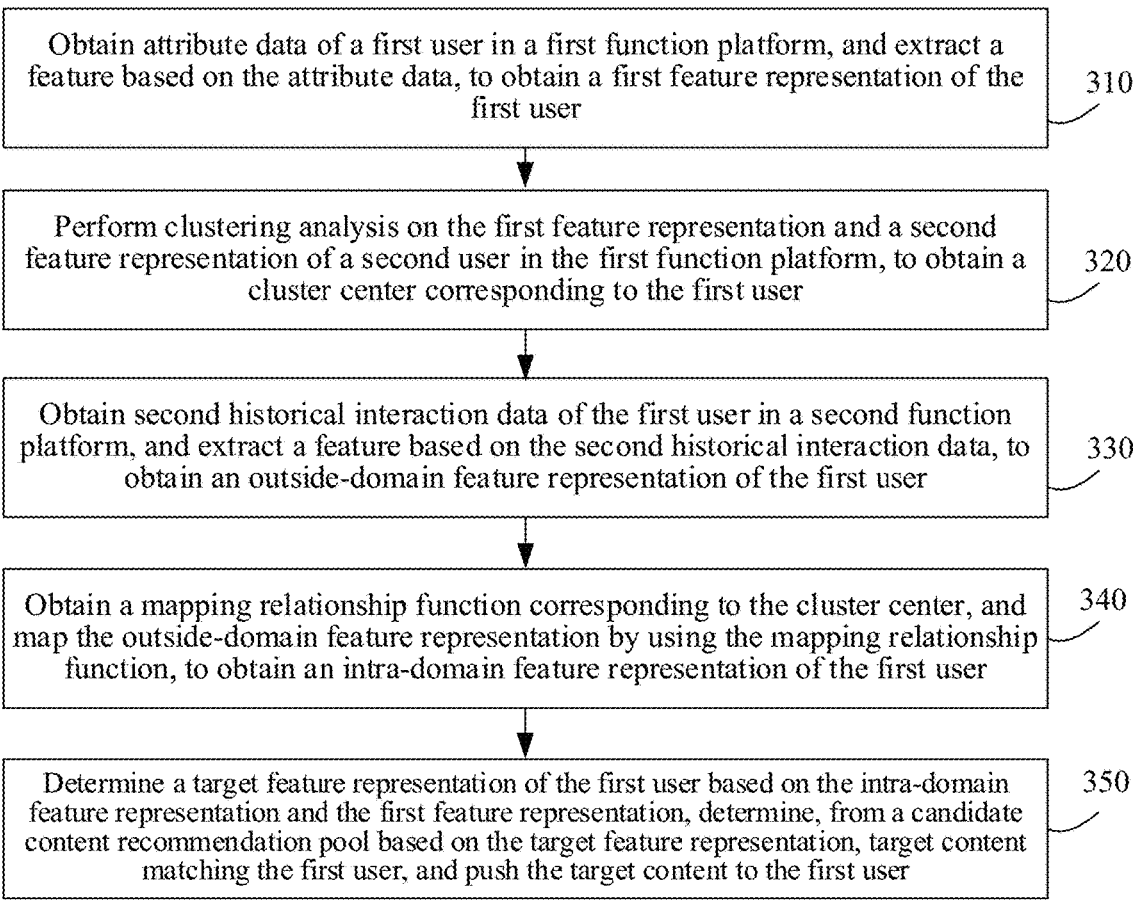

Obtain attribute data of a first user in a first function platform, and extract a feature based on the attribute data, to obtain a first feature representation of the first user — 310

Perform clustering analysis on the first feature representation and a second feature representation of a second user in the first function platform, to obtain a cluster center corresponding to the first user — 320

Obtain second historical interaction data of the first user in a second function platform, and extract a feature based on the second historical interaction data, to obtain an outside-domain feature representation of the first user — 330

Obtain a mapping relationship function corresponding to the cluster center, and map the outside-domain feature representation by using the mapping relationship function, to obtain an intra-domain feature representation of the first user — 340

Determine a target feature representation of the first user based on the intra-domain feature representation and the first feature representation, determine, from a candidate content recommendation pool based on the target feature representation, target content matching the first user, and push the target content to the first user — 350

FIG. 3

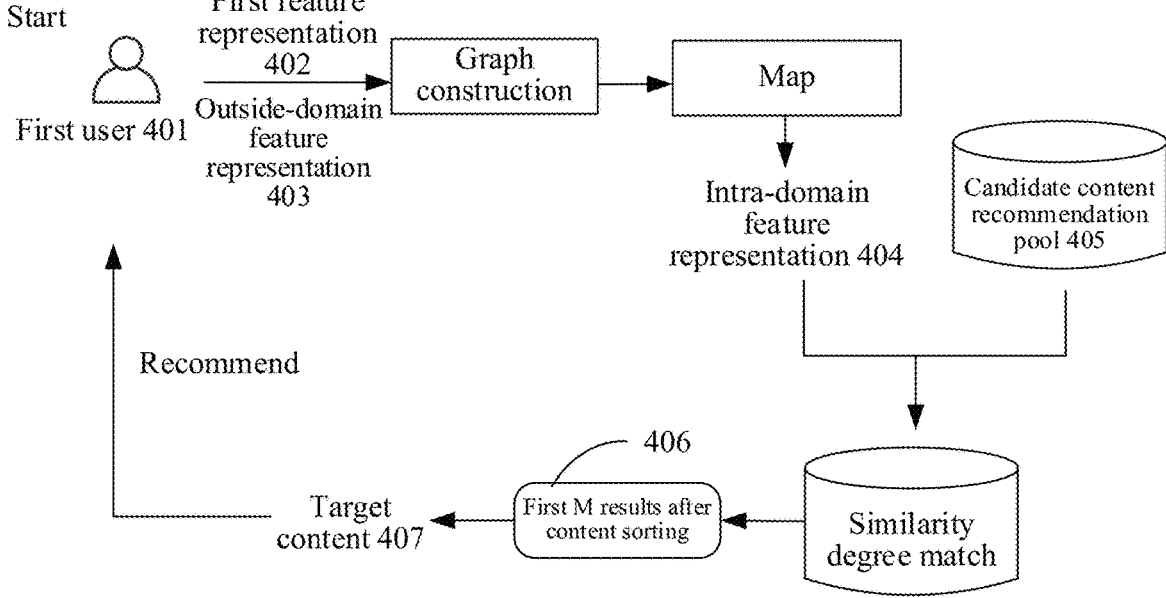

FIG. 4

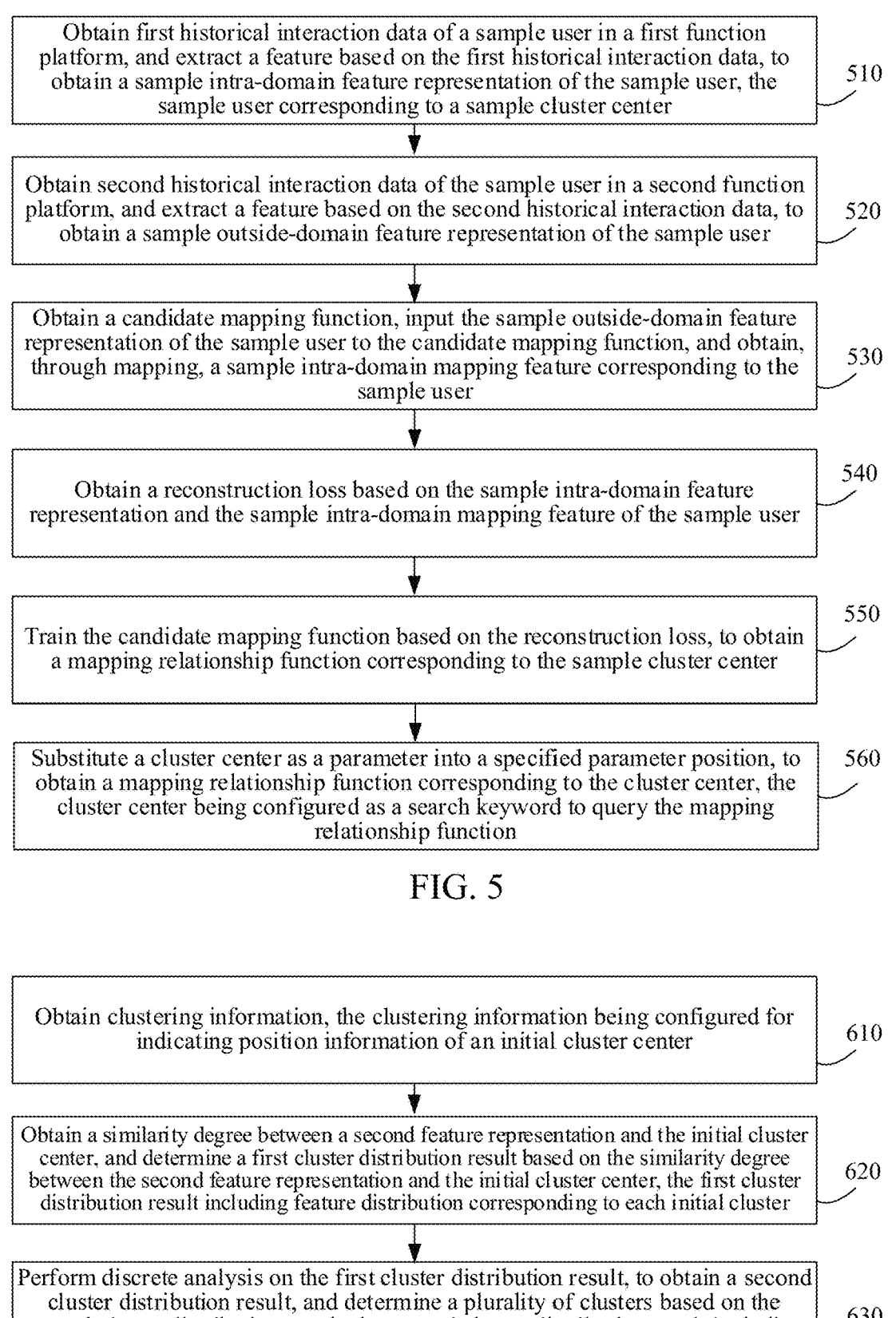

Obtain first historical interaction data of a sample user in a first function platform, and extract a feature based on the first historical interaction data, to obtain a sample intra-domain feature representation of the sample user, the sample user corresponding to a sample cluster center — 510

Obtain second historical interaction data of the sample user in a second function platform, and extract a feature based on the second historical interaction data, to obtain a sample outside-domain feature representation of the sample user — 520

Obtain a candidate mapping function, input the sample outside-domain feature representation of the sample user to the candidate mapping function, and obtain, through mapping, a sample intra-domain mapping feature corresponding to the sample user — 530

Obtain a reconstruction loss based on the sample intra-domain feature representation and the sample intra-domain mapping feature of the sample user — 540

Train the candidate mapping function based on the reconstruction loss, to obtain a mapping relationship function corresponding to the sample cluster center — 550

Substitute a cluster center as a parameter into a specified parameter position, to obtain a mapping relationship function corresponding to the cluster center, the cluster center being configured as a search keyword to query the mapping relationship function — 560

FIG. 5

Obtain clustering information, the clustering information being configured for indicating position information of an initial cluster center — 610

Obtain a similarity degree between a second feature representation and the initial cluster center, and determine a first cluster distribution result based on the similarity degree between the second feature representation and the initial cluster center, the first cluster distribution result including feature distribution corresponding to each initial cluster — 620

Perform discrete analysis on the first cluster distribution result, to obtain a second cluster distribution result, and determine a plurality of clusters based on the second cluster distribution result, the second cluster distribution result including a cluster center corresponding to each second feature representation — 630

FIG. 6

CONTENT RECOMMENDATION METHOD AND APPARATUS, DEVICE, MEDIUM, AND PROGRAM PRODUCT

RELATED APPLICATIONS

The present application is a continuation of International Application No. PCT/CN2023/118248, filed on Sep. 12, 2023, which claims priority to Chinese Patent Application No. 202211516062.9, filed on Nov. 29, 2022. The entire disclosures of the prior applications are hereby incorporated by reference.

FIELD OF THE TECHNOLOGY

This disclosure relates to the field of computer technologies, including to a content recommendation method and apparatus, a device, a medium, and a program product.

BACKGROUND OF THE DISCLOSURE

A user obtains needed information content from different platforms based on a network. However, because there is a huge amount of information content in the platforms, it is difficult for the user to filter the information content and obtain desired information content.

In the related art, a personalized recommendation system collects attributes and historical interaction data of the user on the platform after obtaining authorization, captures interest features of the user, generates a specific recommendation list for the user through a designed recommendation algorithm, and recommends personalized content to the user.

However, a data sparseness problem and a cold start problem exist in the recommendation system. The data sparseness problem refers to that there is little historical interaction data of the user, and the cold start problem refers to that there is no historical interaction data after a new user enters the system. The recommendation system cannot accurately analyze interests and preferences of the user. Consequently, content cannot be accurately pushed to the user, a resource supporting a content pushing function is wasted, and resource utilization is low.

SUMMARY

According to this disclosure, a content recommendation method and apparatus, a device, a medium, and a program product are provided.

According to an aspect, a content recommendation method is provided. In the method, a first feature representation of a first user in a first function platform is obtained. The first feature representation of the first user is extracted from attribute data of the first user. A second feature representation of a second user in the first function platform is obtained. The second feature representation of the second user is extracted from attribute data of the second user. A cluster center corresponding to the first user is determined based on the first feature representation and the second feature representation. An extra-domain feature representation of the first user in a second function platform is determined. The extra-domain feature representation of the first user is extracted from first historical interaction data of the first user in the second function platform. A mapping relationship function corresponding to the cluster center is determined. The mapping relationship function indicates a feature representation relationship between the second function platform and the first function platform. An intra-domain feature representation of the first user is determined. The intra-domain feature representation is based on mapping the extra-domain feature representation with the mapping relationship function. A target feature representation of the first user is determined based on the intra-domain feature representation and the first feature representation. Target content from a candidate content recommendation pool that matches the target feature representation of the first user is determined. The target content is pushed to the first user.

According to an aspect, a content recommendation apparatus is provided, the apparatus including processing circuitry configured to obtain a first feature representation of a first user in a first function platform. The first feature representation of the first user is extracted from attribute data of the first user. The processing circuitry is configured to obtain a second feature representation of a second user in the first function platform The second feature representation of the second user is extracted from attribute data of the second user. The processing circuitry is configured to determine a cluster center corresponding to the first user based on the first feature representation and the second feature representation. The processing circuitry is configured to obtain an extra-domain feature representation of the first user in a second function platform. The extra-domain feature representation of the first user is extracted from first historical interaction data of the first user in the second function platform. The processing circuitry is configured to obtain a mapping relationship function corresponding to the cluster center. The mapping relationship function indicates a feature representation relationship between the second function platform and the first function platform. The processing circuitry is configured to determine an intra-domain feature representation of the first user. The intra-domain feature representation is based on mapping the extra-domain feature representation with the mapping relationship function. The processing circuitry is configured to determine a target feature representation of the first user based on the intra-domain feature representation and the first feature representation. The processing circuitry is configured to determine target content from a candidate content recommendation pool that matches the target feature representation of the first user. The processing circuitry is configured to push the target content to the first user.

According to an aspect, a computer device is provided. The computer device includes a processor and a memory, the memory having computer-readable instructions stored therein, and the computer-readable instructions being loaded and executed by the processor to implement the content recommendation method according to the embodiments of this disclosure.

According to an aspect, a non-transitory computer-readable storage medium is provided. The computer-readable storage medium has computer-readable instructions stored therein, and the non-transitory computer-readable instructions being loaded and executed by a processor to implement the content recommendation method according to the embodiments of this disclosure.

According to an aspect, a computer program product is provided, including computer-readable instructions, the computer-readable instructions, when executed by a processor, implementing the content recommendation method according to the embodiments of this disclosure.

Details of one or more embodiments of this disclosure are described in the accompanying drawings and the description below. Other features and advantages of this disclosure are apparent from the description, drawings and claims.

BRIEF DESCRIPTION OF THE DRAWINGS

To describe the technical solutions in embodiments of this disclosure more clearly, the following briefly introduces the accompanying drawings required for describing embodiments. The accompanying drawings in the following descriptions merely show some embodiments of this disclosure, and a person of ordinary skill in the art may still derive other drawings based on these accompanying drawing.

FIG. 3 is a flowchart of a content recommendation method according to an example of this disclosure.

FIG. 4 is a schematic diagram of recommending personalized content to a first user based on an intra-domain feature according to an example of this disclosure.

FIG. 5 is a flowchart of a method for training a personalized mapping relationship function according to an example of this disclosure.

FIG. 6 is a flowchart of a clustering analysis method according to an example of this disclosure.

DESCRIPTION OF EMBODIMENTS

Figure 1:
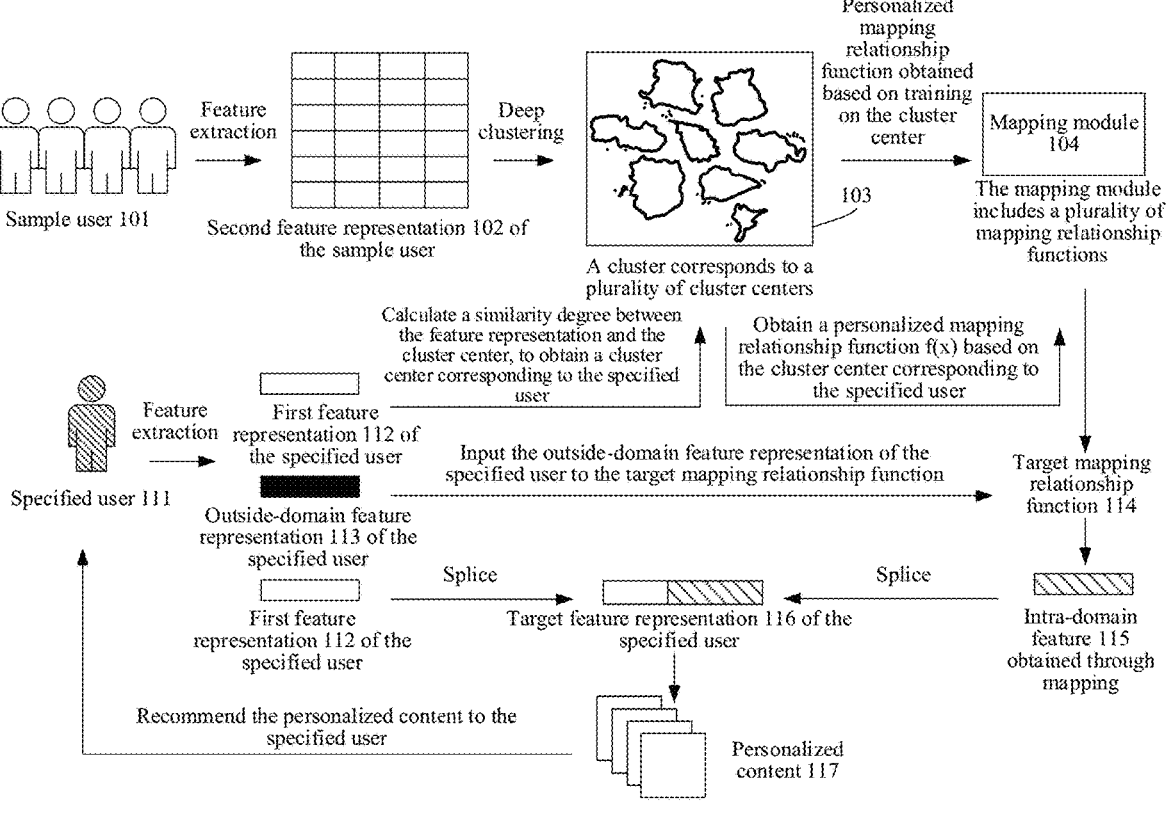
FIG. 1 is a schematic diagram of recommending personalized content to a specified user according to an example of this disclosure.

The following describes the technical solutions in the embodiments of this disclosure with reference to the accompanying drawings in the embodiments of this disclosure. The described embodiments are only some of the embodiments of this disclosure rather than all of the embodiments. Other embodiments obtained by a person of ordinary skill in the art based on the embodiments of this disclosure shall fall within the protection scope of this disclosure.

Any descriptions of terms in this disclosure terms are provided as examples only and are not intended to limit the scope of the disclosure.

Artificial intelligence (AI) is a theory, a method, a technology, and an disclosure system that use a digital computer or a machine controlled by the digital computer to simulate, extend, and expand human intelligence, perceive an environment, obtain knowledge, and use the knowledge to obtain an optimal result. In other words, the artificial intelligence is a comprehensive technology in computer science. The artificial intelligence attempts to understand an essence of intelligence, and produces a new intelligent machine that can react in a manner similar to the human intelligence. The artificial intelligence is to study design principles and implementation methods of various intelligent machines, to enable the machines to have functions of perception, reasoning, and decision-making.

The artificial intelligence technology is a comprehensive discipline, and relates to a wide range of fields including both a hardware-level technology and a software-level technology. Basic artificial intelligence technologies generally include technologies such as a sensor, a dedicated artificial intelligence chip, cloud computing, distributed storage, a technology of extracting a large feature representation, an operating/interaction system, and electromechanical integration. Artificial intelligence software technologies mainly include several major directions such as a computer vision technology, a speech processing technology, a natural language processing technology, and machine learning/deep learning.

A personalized recommendation system is a product of development of the internet and the e-commerce. The personalized recommendation system is a high-level commercial intelligence platform based on massive data mining, and provides a personalized information service and decision support to a user.

The personalized recommendation system collects data of attributes and historical behaviors of the user, constructs a user interest model by using a designed recommendation algorithm, generates a specific recommendation list for each user, and pushes the specific recommendation list to the user, to implement personalized recommendation.

However, in the recommendation system, there are two long-term problems, namely, a data sparseness problem and a cold start problem. The data sparseness problem refers to that there are few interaction records between the user and an item, and it is difficult to well capture an interest of the user or a characteristic of the item. The cold start problem refers to a situation in which a new user or a new item has just entered the system and has no interaction record. A conventional recommendation algorithm makes a recommendation based on interaction data between the user and the item. As a result, it is difficult to make an appropriate recommendation in the two cases.

Transfer learning (TL) is a term in machine learning, and refers to an impact of one type of learning on another type of learning, or an impact of learned experience on completing other activities. Transfer is widely used in learning of various knowledge, skills, and social norms.

The transfer learning uses rich knowledge and information in a source domain to improve performance of a target domain and reduce a quantity of samples required by the target domain, and is widely used in a visual domain and a natural language processing domain. For example, knowledge (or a model) for identifying a car may also be used to improve an ability to identify a truck.

The source domain (SD) refers to an existing knowledge domain, represents a domain different from a target sample, and generally has rich supervisory information and label data. The target domain (TD) refers to a domain in which learning needs to be performed, represents a domain in which the target sample is located, and generally only has a small amount of label data or no label data. The source domain may be a domain serving as a source of transferred knowledge in the transfer learning. The target domain may be a domain serving as a destination of the transferred knowledge in the transfer learning.

Inspired by the transfer learning, when the cold start problem and the data sparseness problem are being solved, interactive information of the user in another domain (the source domain) may be obtained and the interactive information is analyzed, to capture a preference of the user in a specific aspect and enrich data of the target domain. Alternatively, information available for the recommendation system is added when the new user enters the system, to alleviate the data sparseness problem and the cold start problem. Therefore, personalized content is recommended to the user across the domains.

The cross-domain recommendation aims to combine data of a plurality of domains, and introduce information of another domain (the source domain) to assist, so that a better recommendation in the target domain and even in the plurality of domains can be made. Some overlapping information generally needs to exist between different domains. For example, a public user in different domains, a same item in the different domains, or the like all belongs to a category of the overlapping information. Generally, such overlapping information is required, to transfer information between the different domains. The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

For the cold start problem of the user, there is a mainstream branch in a cross-domain recommendation algorithm. To be specific, an appropriate mapping function is established to transfer the interest of the user, that is, a mapping of the interest from the source domain to the target domain is established.

An assumption of this type of the method is that there is a mapping relationship between the interest of the user in the different domains. In this case, the interest of the user in the source domain may be mapped, to obtain the interest in the target domain. Even if the user has no behavior in the target domain, the interest of the user in the target domain can be obtained based on the interest of the user in the source domain by using the mapping function, so that appropriate recommendation is made, and the cold start problem of the user is alleviated.

However, in the related art, in the cross-domain recommendation algorithm based on mapping, all users share the same mapping function. There is a personalization difference between the users, and the mapping of the interest from the source domain to the target domain greatly differs. If all the users share the same mapping function, a complex mapping relationship cannot be well modeled. Consequently, accuracy of a mapping result is low, and an effect of making personalized content recommendation to the user based on the mapping result is poor.

In the embodiments of this disclosure, a personalized mapping function is designed, to map an outside-domain feature of a cold user in the source domain to the target domain by using the personalized mapping function, so that an intra-domain feature of the cold user is obtained, and personalized content is recommended to the cold user based on the intra-domain feature. The cold user is a user that lacks relevant information, and is generally a new user.

For example, as shown in FIG. 1, attribute data of sample users 101 in a first function platform is first obtained. Feature extraction is performed on the attribute data of the sample users 101, to obtain second feature representations 102 of the sample users. Clustering analysis is performed on the second feature representations 102 of the sample users, to obtain a cluster distribution result 103. The cluster distribution result 103 includes a plurality of clusters, and each cluster corresponding to a respective corresponding cluster center. A candidate mapping function is trained based on the cluster center, to obtain a mapping module 104. The mapping module 104 includes a plurality of mapping relationship functions. Each mapping relationship function in the mapping module 104 corresponds to one cluster. The cluster center of the cluster is obtained, and a corresponding mapping relationship function may be indexed based on the cluster center.

Attribute data of a specified user 111 in the first function platform is obtained, and feature extraction is performed on the attribute data of the specified user 111, to obtain a first feature representation 112 of the specified user. The specified user 111 may be a cold user, to be specific, a user having no historical interaction data in the first function platform. The specified user 111 may alternatively be a reflow user, to be specific, a user having no historical interaction data in the first function platform in a historical period, but having historical interaction data in a recent period.

Second historical interaction data of the specified user 111 in a second function platform is obtained, and feature extraction is performed on the historical interaction data of the specified user 111, to obtain an outside-domain feature representation 113 of the specified user.

A similarity degree between the first feature representation 112 of the specified user and the cluster center in the cluster distribution result 103 is calculated, and a cluster center corresponding to the specified user 111 is obtained based on the similarity degree. A target mapping relationship function 114 applicable to the specified user 111 is obtained from the mapping module 104 based on the cluster center corresponding to the specified user 111.

The outside-domain feature representation 113 of the specified user is input to the target mapping relationship function 114, and an intra-domain feature 115 of the specified user 111 is obtained through mapping. The intra-domain feature 115 of the specified user 111 and the first feature representation 112 of the specified user are spliced together to form a target feature representation 116 of the specified user.

Personalized content 117 that the specified user 111 may be interested in is filtered out based on the target feature representation 116 of the specified user, and the personalized content 117 is recommended to the specified user 111.

The attribute data, the historical interaction data, and the like of the user are data actively uploaded by the user, or data obtained after individual authorization of the user.

Information (including but not limited to attribute information of the user, historical interaction information between the user and the first function platform and the second function platform, and the like) and data (including but not limited to data configured for analysis, stored data, displayed data, and the like) involved in this application are authorized by the user individually or fully authorized by all parties, and collection, use, and processing of relevant data need to comply with relevant laws, regulations, and standards of relevant countries and regions. For example, the attribute data involved in this application is obtained under full authorization.

Figure 2:
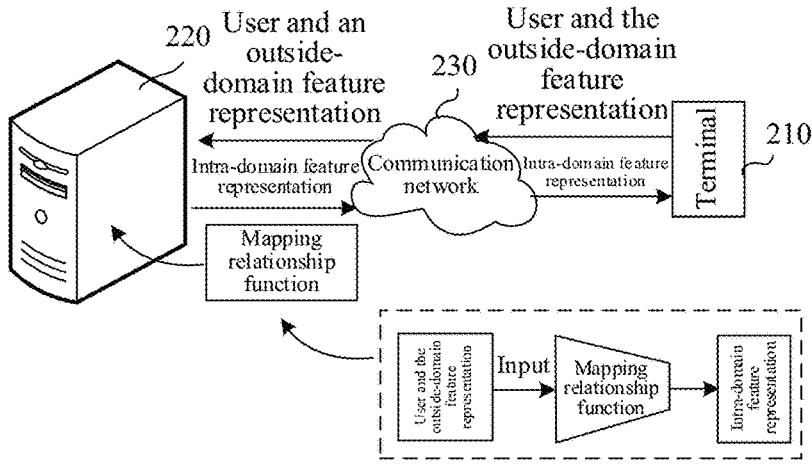
FIG. 2 is a schematic diagram of an implementation environment according to an example of this disclosure.

Then, an implementation environment involved in the embodiments of this disclosure is described. For example, referring to FIG. 2, the implementation environment involves a terminal 210 and a server 220, and the terminal 210 and the server 220 are connected through a communication network 230.

In some embodiments, the terminal 210 is configured to transmit at least one of a first feature representation or a second feature representation and an outside-domain (e.g., extra-domain) feature representation of a user to the server 220. In some embodiments, an application having a feature mapping function (for example, a function of mapping the outside-domain feature representation to an intra-domain feature representation) is installed in the terminal 210. For example, an application having a personalized mapping function is installed in the terminal 210. For example, a search engine program, a travel application, a life assistance application, an instant messaging application, a video program, a game program, a news application, a content recommendation application, and the like are installed in the terminal 210. This is not limited in this embodiment of this disclosure.

After obtaining the first feature representation, the second feature representation, and the outside-domain feature representation of the user, the server 220 performs feature analysis on the first feature representation, the second feature representation, and the outside-domain feature representation of the user, to obtain the intra-domain feature representation of the user, and filters out, based on the intra-domain feature representation of the user, personalized content that the user may be interested in, to apply the personalized content to a downstream application, such as user aggregation based on an intra-domain feature and personalized content recommendation to the user.

After obtaining the first feature representation, the second feature representation, and the outside-domain feature representation of the user, the server 220 corresponds to the intra-domain feature representation of the user, and returns the intra-domain feature representation to the terminal 210. The terminal 210 finally filters out the personalized content based on the intra-domain feature representation, and recommends the content to the user. The personalized content includes intra-domain information flow content that the user may be interest in, such as an information flow article, a video, and music.

The foregoing terminal may be a terminal device in various forms such as a mobile phone, a tablet computer, a desktop computer, a portable notebook computer, a smart television, an in-vehicle terminal, and a smart home device. This is not limited in this embodiment of this disclosure.

The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

A cloud technology is a hosting technology that unifies a series of resources such as hardware, software, and a network in a wide area network or a local area network, to implement data computing, storage, processing, and sharing. A general term for a network technology, an information technology, an integration technology, a management platform technology, and an application technology that are applied based on a cloud computing business model. The cloud technology can form resource pools and be used on demand. A cloud computing technology is becoming an important support. A background service of a technical network system needs a large quantity of computing and storage resources, such as a video website, an image website, and more portal websites. With the development and application of the internet industry, each item may have identification flag and needs to be transmitted to the background system for logic processing. Data of different levels is processed separately. Various industry data needs powerful system support, and this be implemented only through cloud computing.

In some embodiments, the server may be alternatively implemented as a node in a blockchain system.

The content recommendation method provided in this disclosure is described with reference to the foregoing term introduction and examples. The method may be performed by the server or the terminal, or may be jointly performed by the server and the terminal. In the embodiments of this disclosure, an example in which the method is performed by the server is used for description. As shown in FIG. 3, the method includes the following operations.

Operation 310: Obtain attribute data of a first user in a first function platform, and extract a feature based on the attribute data, to obtain a first feature representation of the first user.

The first user is a specific user, and is a user to whom content needs to be pushed. The first user may be referred to as the specified user or a target user. The attribute data is data configured for describing a user characteristic. The attribute data of the first user is data that describes a user characteristic of the first user. The attribute data of the first user in the first function platform is the attribute data generated or stored by the first user in the first function platform. The first feature representation is a feature representation of the first user.

The first function platform includes different types of platform elements, and the first user may interact with the platform elements in the first function platform.

In some embodiments, a type of the first function platform includes, but is not limited to, a game platform, a social platform, or a shopping platform.

In some embodiments, the types of the platform elements included in the first function platform include, but are not limited to, a video element, such as a television drama or an animation video; an image element, to be specific, an image including information stream content; a music element, such as a song or an accompaniment; and a text element, such as a journal article or an e-book.

In some embodiments, a service that can be provided by the first function platform includes, but is not limited to, online livestreaming push, channel content push, subscription article push, or communication community push.

In some embodiments, the first user does not effectively interact with the platform element in the first function platform. In other words, the first user does not have valid historical interaction data in the first function platform, including but not limited to the following cases.

(1) The first user is a newly registered user of the first function platform, that is, a cold user, having no historical interaction data.

(2) The first user is a reflow user of the first function platform. The first user does not log in the first function platform for more than a preset duration, and the historical interaction data is cleared.

(3) A login frequency of the first user in the first function platform is less than a frequency threshold, and an amount of historical interaction data is less than a threshold.

(4) A registration duration of the first user in the first function platform does not reach a duration threshold, and validity of the historical interaction data within the duration threshold is low.

In some embodiments, a manner in which the first user interacts with the first function platform to generate the historical interaction data includes, but is not limited to, the following manners.

(1) The first user browses content pushed by the first function platform, namely, at least one of an article, a video, livestreaming content, or the like.

(2) The first user performs a transaction-related behavior in the first function platform, namely, shopping, selling, commenting on goods, or the like.

(3) The first user actively uploads content in the first function platform, namely, at least one of an article, a picture, a video, or the like.

In some embodiments, the attribute data of the first user in the first function platform includes, but is not limited to, age information of the first user, an internet protocol (IP) address of the first user, gender information of the first user, or a device model of the first user.

For example, feature extraction is performed on the attribute data of the first user in the first function platform by using a feature extraction network, to obtain the first feature representation of the first user.

Operation 320: Perform clustering analysis on the first feature representation and a second feature representation of a second user in the first function platform, to obtain a cluster center corresponding to the first user.

The first function platform includes the first user and at least one second user. Each user has respective corresponding attribute data. The second feature representation is a feature representation of the second user.

A computer device may extract the second feature representation of the second user based on the attribute data of the second user in the first function platform.

The second feature representation of the second user and the first feature representation of the first user belong to a same type of feature representation, or are feature representations extracted by using a same feature extraction network, and are configured for representing characteristics of the attribute data of the users in the first function platform.

The computer device may perform clustering analysis on the second user based on the second feature representation of the second user, to obtain a plurality of clusters. Each second user corresponds to a respective cluster, a center point of the cluster is the cluster center, and each cluster includes a respective corresponding cluster center.

The computer device may obtain a similarity degree between the first feature representation and the cluster center, and determine the cluster center corresponding to the first user based on the similarity degree.

In an embodiment, the obtaining a similarity degree between the first feature representation and the cluster center, and determining the cluster center corresponding to the first user based on the similarity degree includes: calculating a distance between the first feature representation and each cluster center, and using a cluster center at a smallest distance from the first feature representation as the cluster center corresponding to the first user. In this embodiment, the similarity degree between the first feature representation and the cluster center is measured based on the distance between the first feature representation and the cluster center, so that it is easy to find a more suitable cluster center. Therefore, accurate pushing can be performed, and a resource supporting a content pushing function is not wasted.

In an embodiment, the obtaining a similarity degree between the first feature representation and the cluster center, and determining the cluster center corresponding to the first user based on the similarity degree includes: calculating the similarity degree between the first feature representation and each cluster center; determining, based on the similarity degree, a probability that the first user belongs to each cluster; and filtering out a maximum probability from the determined probability, and determining, based on the maximum probability, the cluster center corresponding to the first user. In this embodiment, the similarity degree is used to calculate the probability that the first user belongs to each cluster, and the maximum probability is filtered out, so that a cluster center of a cluster to which the first user belongs at the maximum probability is used as the cluster center corresponding to the first user. In this embodiment, content recommendation can also be performed more accurately, and the resource supporting the content push function is not wasted.

Operation 330: Obtain second historical interaction data of the first user in a second function platform, and extract a feature based on the second historical interaction data, to obtain an outside-domain feature representation of the first user.

The second function platform also includes different types of platform elements. The first user may interact with the platform elements in the second function platform.

A relationship between the first function platform and the second function platform includes, but is not limited to: (1) different function modules in same software, where the first user is an account logging in the software; (2) different functional modules in a same website, where the first user is an account logging in the website, or the first user is a user corresponding to an identifier code of a terminal currently browsing the website; (3) accounts of the first user in the first function platform and the second function platform are associated. For example, the first user logs in the first function platform by using a first account, and logs in the second function platform by using a second account, and between the first function platform and the second function platform, a binding relationship is established between the first account and the second account.

In some embodiments, there is an effective interactive behavior between the first user and the platform elements in the second function platform. In other words, the first user has effective historical interaction data in the second function platform, including but not limited to the following several cases.

(1) A duration of registration of the first user in the second function platform exceeds a duration threshold.

(2) A login frequency of the first user in the second function platform is greater than a frequency threshold.

(3) An amount of historical interaction data of the first user in the second function platform exceeds a threshold.

The second historical interaction data of the first user in the second function platform is obtained, and feature extraction processing is performed on the historical interaction data, to obtain the outside-domain feature representation of the first user.

The outside-domain refers to a range outside the first function platform, and the outside-domain feature representation is historical interaction data generated by the first user in another function platform instead of the first function platform.

The first user may interact with a platform element in any type of function platform. In other words, the first user may have historical interaction data in any type of function platform. A feature representation obtained after feature extraction processing is performed on historical interaction data generated when the first user interacts with a platform element in an area other than the first function platform is represented as the outside-domain feature representation. This is not limited in this embodiment.

Operation 340: Obtain a mapping relationship function corresponding to the cluster center, and map the outside-domain feature representation by using the mapping relationship function, to obtain an intra-domain feature representation of the first user.

The mapping relationship function is configured for indicating a mapping relationship between feature representations in the second function platform and the first function platform. The mapping relationship function corresponding to the cluster center is a mapping relationship function matching the cluster center. The computer device may input the outside-domain feature representation to the mapping relationship function for mapping, to obtain the intra-domain feature representation of the first user outputted by the mapping relationship function.

In some embodiments, the obtaining a mapping relationship function corresponding to the cluster center, and mapping the outside-domain feature representation by using the mapping relationship function, to obtain an intra-domain feature representation of the first user includes: performing parameter replacement on a pre-generated parameter-containing mapping function based on the cluster center corresponding to the first user, to obtain the mapping relationship function corresponding to the cluster center; and mapping the outside-domain feature representation by using the mapping relationship function, to obtain the intra-domain feature representation of the first user.

The computer device may perform parameter replacement on the parameter-containing mapping function based on the cluster center corresponding to the first user, to obtain the mapping relationship function corresponding to the cluster center; and map the outside-domain feature representation by using the mapping relationship function, to obtain the intra-domain feature representation of the first user.

In an embodiment, the performing parameter replacement on the pre-generated parameter-containing mapping function based on the cluster center corresponding to the first user, to obtain the mapping relationship function corresponding to the cluster center includes: obtaining the parameter-containing mapping function, the parameter-containing mapping function including a specified parameter position in a to-be-filled state; and substituting the cluster center as a parameter into the specified parameter position, to obtain the mapping relationship function corresponding to the cluster center, the cluster center being used as a search keyword to query the mapping relationship function.

The computer device may obtain sample data in advance, perform training based on the sample data, determine several discrete cluster centers, determine a mapping relationship function corresponding to each cluster center, and extract a parameter value from the mapping relationship function based on a structure of the parameter-containing mapping function, to be specific, based on the specified parameter position in the to-be-filled state, to correspond the extracted parameter value to the corresponding cluster center, and form a preset mapping relationship between the cluster center and the parameter value.

Further, the computer device may determine, based on the cluster center corresponding to the first user and the preset mapping relationship, a parameter value that needs to be replaced to, and substitute the parameter value into the parameter-containing mapping function, to obtain the mapping relationship function corresponding to the cluster center. Further, the computer device may input the outside-domain feature representation to the mapping relationship function for mapping, and output the intra-domain feature representation of the first user.

In another embodiment, the mapping relationship function may be a neural network model, and the parameter-containing mapping function may be a neural network model with a replaceable model parameter.

In an embodiment, the cluster center may be used as the search keyword to query the mapping relationship function. Each mapping relationship function may correspond to one key value for index. The computer device may use a current cluster center as the search keyword, and respectively match the search keyword with target cluster centers corresponding to a search key. When matching succeeds, a search value corresponding to the target cluster center is the mapping relationship function corresponding to the current cluster center.

A type of the parameter-containing mapping function may be arbitrary, and a manner of performing parameter replacement on the parameter-containing mapping function based on the cluster center may be arbitrary. This is not limited in this embodiment.

Operation 350: Determine a target feature representation of the first user based on the intra-domain feature representation and the first feature representation, determine, from a candidate content recommendation pool based on the target feature representation, target content matching the first user, and push the target content to the first user.

The target feature representation is a feature representation determined based on the intra-domain feature representation and the first feature representation, and is a basis for matching the content from the candidate content recommendation pool. The target content is the content pushed to the first user.

The computer device may combine the intra-domain feature representation and the first feature representation, to obtain the target feature representation of the first user, match the first user with the candidate content recommendation pool based on the target feature representation, to obtain target content through matching, and push the target content in the candidate content recommendation pool to the first user.

The intra-domain feature representation of the first user obtained through operation 340 may be configured for indicating that the first user has a possible interactive behavior in the first function platform. The first user does not have the historical interaction data in the first function platform. In other words, the intra-domain feature representation indicates that a characteristic of the first user when the first user interacts with the platform element in the second function platform is mapped to the first function platform.

In some embodiments, the computer device may combine the intra-domain feature representation and the first feature representation in a splicing manner, to obtain the target feature representation of the first user. The target feature representation is configured for recommending personalized content to the first user.

For example, as shown in FIG. 4, a first feature representation 402 and an outside-domain feature representation 403 of a first user 401 are obtained. A graph is constructed, and the first feature representation 402 and the outside-domain feature representation 403 are represented in a form of the graph. The outside-domain feature representation 403 is mapped by using a mapping function, to obtain an intra-domain feature representation 404 of the first user 401. A candidate content recommendation pool 405 is obtained. Similarity degree matching is performed on the intra-domain feature representation 404 and content in the candidate content recommendation pool 405, to obtain a similarity degree matching result 406. Content whose corresponding similarity degree values rank first M in the similarity degree matching result 406 is used as target content 407. The target content 407 is recommended to the first user 401.

A manner of combining the intra-domain feature representation and the first feature representation may be arbitrary, and a type and a quantity of content included in the candidate content recommendation pool may be arbitrary. A manner of performing similarity degree matching on the intra-domain feature representation and the content in the candidate content recommendation pool may be arbitrary. When the target content is selected based on the similarity degree matching result, a quantity and a type of the target content may be arbitrary. This is not limited in this embodiment.

In conclusion, in the method provided in this disclosure, clustering analysis is performed on all users in the first function platform, to obtain a cluster to which each user belongs and a cluster center corresponding to each user, and a personalized mapping relationship function is obtained based on the cluster center. The personalized mapping relationship function can implement a mapping process from the outside-domain feature representation to the intra-domain feature representation for different users, so that accuracy of a mapping result is improved. The first feature representation of the first user and the outside-domain feature representation that is obtained through feature extraction performed on the historical interaction data of the first user in the second function platform are obtained. The cluster center corresponding to the first user is found based on the first feature representation. The mapping relationship function corresponding to the first user is obtained based on the cluster center corresponding to the first user. The outside-domain feature representation of the first user is input to the mapping relationship function. The intra-domain feature representation of the first user is obtained through mapping. An interaction characteristic of the first user in the first function platform may be obtained when the first user has the historical interaction data in only the second function platform and does not have the historical interaction data in the first function platform. Therefore, personalized content in the first function platform is recommended to the first user based on the intra-domain feature representation and the first feature representation of the first user, so that a cold user problem and a data sparseness problem are solved, the recommended content is more consistent with a real interest of the first user, a recommendation effect is improved, and a resource supporting a content pushing function is not wasted.

In the method provided by this embodiment, parameter replacement is performed on the parameter-containing mapping function to replace a parameter in the parameter-containing mapping function with the cluster center corresponding to the first user. The personalized mapping relationship function that satisfies a mapping requirement of the first user is found. The outside-domain feature representation of the first user is mapped based on the mapping relationship function, to obtain the intra-domain feature representation of the first user. Therefore, when the first user has no historical interaction data in the domain, a feature of the first user in the domain can be learned, and feature migration of the first user is implemented. The personalized mapping function can be configured for performing feature mapping for each different first user, so that accuracy and efficiency of the feature mapping are also improved. Therefore, the target content pushed to the first user is better satisfies a requirement of the first user, and further the resource supporting the content push function may not be wasted.

In the method provided by this embodiment, the attribute data of all the second users in the first function platform is obtained, and feature extraction is performed, to obtain the second feature representation that can represent each second user. Clustering analysis is performed on the second user based on the second feature representation, to generate the plurality of clusters, so that the second users in the first function platform can be quickly classified. Each cluster has the corresponding cluster center; and the cluster to which the first user belongs and the corresponding cluster center can be obtained based on the similarity degree between the first feature representation of the first user and the cluster center, to obtain a clustering analysis result with high accuracy. Therefore, the target content pushed to the first user better satisfies the requirement of the first user, and further the resource supporting the content push function may not be wasted.

When the outside-domain feature representation of the first user is mapped to the intra-domain feature representation, the personalized mapping function matching the first user needs to be filtered out. As shown in FIG. 5, FIG. 5 is a flowchart of a method for training a personalized mapping relationship function according to an example of this disclosure. The method includes the following operation 510 to operation 560. Operation 510 to operation 550 may be a process of obtaining a parameter-containing mapping function. The parameter-containing mapping function includes a specified parameter position in a to-be-filled state.

Operation 510: Obtain first historical interaction data of a sample user in a first function platform, and extract a feature based on the first historical interaction data, to obtain a sample intra-domain feature representation of the sample user, the sample user corresponding to a sample cluster center.

The sample user corresponds to the sample cluster center.

The first function platform includes at least one sample user, and there is an interactive behavior between the sample user and a platform element in the first function platform, in other words, the sample user has historical interaction data in the first function platform.

For example, feature extraction is performed on the first historical interaction data of the sample user in the first function platform by using a feature extraction network, to obtain a sample outside-domain feature representation of the sample user.

Operation 520: Obtain second historical interaction data of the sample user in a second function platform, and extract a feature based on the second historical interaction data, to obtain the sample outside-domain feature representation of the sample user.

Operation 520 is similar to operation 510.

The sample user has the historical interaction data in both the first function platform and the second function platform.

In some embodiments, a manner of performing feature extraction on the sample user, to obtain the intra-domain feature representation and the outside-domain feature representation may be arbitrary, including but not limited to the foregoing manner of using the feature extraction network. When the feature extraction network is used to perform feature extraction on the historical interaction data of the sample user, the feature extraction network used may be arbitrary. This is not limited in this embodiment.

Operation 530: Obtain a candidate mapping function, input the sample outside-domain feature representation of the sample user to the candidate mapping function, and obtain, through mapping, a sample intra-domain mapping feature corresponding to the sample user.

Feature analysis is performed on the attribute data of the sample user, to obtain a sample feature representation of the sample user. Clustering analysis is performed on the sample user based on the sample feature representation, to obtain a plurality of clusters.

Each sample user corresponds to a respective cluster, a center point of the cluster is a cluster center, and each cluster includes a respective corresponding cluster center.

A distance between the sample feature representation of the sample user and the cluster center is calculated, and a cluster center at a smallest distance from the sample feature representation is used as the sample cluster center corresponding to the sample user.

The candidate mapping function is obtained. The candidate mapping function is a preset function and has a capability of mapping an outside-domain feature of the sample user to an intra-domain feature. The sample outside-domain feature representation of the sample user is input to the candidate mapping function, and accuracy of the intra-domain mapping feature obtained through mapping is low.

There is a difference between the intra-domain mapping feature and the intra-domain feature representation of the sample user.

A type of the candidate mapping function may be arbitrary. This is not limited in this embodiment.

Operation 540: Obtain a reconstruction loss based on the sample intra-domain feature representation and the sample intra-domain mapping feature of the sample user.

The reconstruction loss ($L_{reconstruction}$) is obtained based on a difference between the sample intra-domain feature representation and the sample intra-domain mapping feature of the sample user.

For example, a manner of obtaining the reconstruction loss is to use a mean square error (MSE). To be specific, a sum of squares of the distance between the sample intra-domain feature representation and the sample intra-domain mapping feature of the sample user is calculated.

In some embodiments, the manner of obtaining the reconstruction loss may be arbitrary, including but not limited to the foregoing manner of the mean square error. This is not limited in this embodiment.

Operation 550: Train the candidate mapping function based on the reconstruction loss, to obtain a mapping relationship function corresponding to the sample cluster center.

Clustering analysis is performed on the sample user, to obtain the sample cluster center corresponding to the sample user.

A target cluster corresponding to a same sample cluster center is obtained, the sample user in the target cluster is selected, and the candidate mapping function is trained.

The sample outside-domain feature representation of the sample user is input to the candidate mapping function, and the intra-domain mapping feature of the sample user is outputted and obtained, and the candidate mapping function is trained based on the reconstruction loss between the intra-domain mapping feature and the sample intra-domain feature representation of the sample user. When the obtained candidate mapping function is configured for performing feature mapping on all sample users belonging to the target cluster, accuracy is high.

The candidate mapping function obtained through training by using the sample users in different clusters, that is, the parameter-containing mapping function, corresponds to the sample cluster center corresponding to the sample user used during training.

The mapping relationship function obtained by training each cluster is recorded in a table form, as shown in Table 1 below.

TABLE 1

| Value | First mapping function | Second mapping function |
|---|---|---|
| Cluster to which a training sample belongs | First cluster | Second cluster |
| Key | First sample cluster center | Second sample cluster center |

Value represents different mapping relationship functions. Each mapping relationship function corresponds to a key value, and is configured for representing an index corresponding to the mapping relationship function.

A sample user in the first cluster is used to train the candidate mapping function. A cluster center of the first cluster is the first sample cluster center, and the first mapping function obtained through the foregoing training process is applicable to feature mapping performed on a first user corresponding to the first sample cluster center. The intra-domain mapping feature obtained through mapping is enabled to approximate an original intra-domain feature representation of the sample user based on the reconstruction loss. When the reconstruction loss satisfies any one of the following conditions, the training is stopped.

(1) The reconstruction loss is lower than a preset threshold. (2) The reconstruction loss converges.

The parameter-containing mapping function obtained through loss training includes the specified parameter position in the to-be-filled state. When content filled in the specified parameter position is different, a mapping characteristic and a mapping effect of the obtained parameter-containing mapping function are also different. In other words, a personalized parameter-containing mapping function may be correspondingly obtained by adjusting a parameter in the specified parameter position. Different parameter-containing mapping functions are applicable to different types of users.

A manner of training the parameter-containing mapping function based on the reconstruction loss may be arbitrary, and the condition for determining that the training stops may be arbitrary. This is not limited in this embodiment.

Operation 560: Substitute the cluster center as a parameter into the specified parameter position, to obtain the mapping relationship function corresponding to the cluster center.

The cluster center is used as a search keyword to query the mapping relationship function.

In Table 1, each mapping relationship function corresponds to a key value for index. A current cluster center is used as the search keyword, and respectively matches the search keyword with target cluster centers corresponding to the key values in Table 1. When matching succeeds, a value corresponding to the target cluster center is the mapping relationship function corresponding to the current cluster center.

A parameter replacement operation may be performed on the parameter-containing mapping function obtained through training in operation 510 to operation 550, to obtain different types of mapping relationship functions. These different types of mapping relationship functions form a mapping module.

Each cluster has a corresponding cluster center. The cluster center of each cluster is substituted as a parameter into the specified parameter position in the parameter-containing mapping function, to obtain the personalized mapping relationship function. The mapping module includes the mapping relationship functions with a quantity the same as a quantity of the cluster centers.

The mapping relationship function corresponding to the cluster center may be configured for performing feature mapping on outside-domain feature representations of all users in the cluster to which the cluster center belongs, to obtain intra-domain mapping features of these users. In other words, when the intra-domain feature of the user in the first function platform needs to be obtained, the cluster center of the cluster may be obtained based on the cluster in which the user is located, and the cluster center is used as an index to find the mapping relationship function corresponding to the cluster center in the mapping module.

In conclusion, in the method provided in this disclosure, the personalized mapping relationship function is obtained based on the cluster center, and the cluster center is used as a parameter at the specified position in the candidate mapping function. The obtained personalized mapping relationship function can implement a mapping process from the outside-domain feature representation to the intra-domain feature representation for different types of users, so that accuracy of a mapping result is improved. The outside-domain feature representation of the user is input to the mapping relationship function, and the intra-domain feature representation of the user is obtained through mapping. An interaction characteristic of the user in the first function platform may be obtained when the user has the historical interaction data in only the second function platform and does not have the historical interaction data in the first function platform. Therefore, personalized content in the first function platform is recommended to the user based on the intra-domain feature representation and the first feature representation of the user, so that a cold user problem and a data sparseness problem are solved, the recommended content is more consistent with a real interest of the user, a recommendation effect is improved, and a resource supporting a content pushing function is not wasted.

In the method provided by this embodiment, a plurality of sample users having the historical interaction data in both the first function platform and the second function platform are obtained. Feature analysis is performed on the historical interaction data, to obtain the intra-domain feature representation of the sample user in the first function platform and the outside-domain feature representation of the sample user in the second function platform. The candidate mapping function having the mapping function is preset. The outside-domain feature representation is input to the candidate mapping function, to obtain the mapped intra-domain mapping feature. The candidate mapping function is trained based on the reconstruction loss between the intra-domain mapping feature and the sample intra-domain feature representation, so that the intra-domain mapping feature approximates the real intra-domain feature representation of the sample user. Therefore, a parameter-containing mapping function with accurate mapping is obtained, an interest feature of the sample user in one domain can be transferred to another domain, and accuracy and an effect of mapping are improved.

In the method provided by this embodiment, the parameter at the specified position in the parameter-containing mapping function is replaced, and the cluster center is substituted as the parameter into the specified parameter position, to obtain the personalized mapping relationship function with a targeted mapping effect. When outside-domain feature representations of different types of users are mapped, an obtained intra-domain mapping feature approximates to a real intra-domain feature representation of each user, and can accurately represent an interaction characteristic between the user and the platform element in the first function platform. When the user does not have the historical interaction data in the first function platform, the intra-domain feature representation of the user can also be obtained, so that the accuracy of mapping is improved, and the cold user problem and the data sparseness problem are solved. When content recommendation is performed based on the intra-domain mapping feature, the recommended content is more consistent with the real interest of the user, so that the recommendation effect is improved, and the resource supporting the content pushing function is not wasted.

The first function platform includes a plurality of users. Clustering analysis is performed on the first user and the second user in the platform, so that each user finds the cluster to which the user belongs, and obtains the corresponding cluster center. As shown in FIG. 6, FIG. 6 is a flowchart of a clustering analysis method according to an example of this disclosure. The method includes the following operations.

Operation 610: Obtain clustering information, the clustering information being configured for indicating position information of an initial cluster center.

In some embodiments, a manner of obtaining the position information of the initial cluster center includes, but is not limited to, the following several manners: 1. Random initialization. 2. Specify a position of the initial cluster center.

When clustering analysis is performed on all users in a first function platform based on the position information of the initial cluster center, a cluster center is learned in a manner of batch training.

The batch training, also referred to as batch training, refers to dividing an entire set of training data into several batches for training. In each batch, n_batch (quantity of batches) pieces of data are selected from the data until training of the entire set of data is completed.

For example, a cluster center $\mu_j$, where j=1, 2, 3, . . . , K, is obtained through random initialization.

A quantity of cluster centers is K, and K is a positive integer.

The quantity of cluster centers corresponds to a quantity of clusters. The quantity of cluster centers may be any specified value. This is not limited in this embodiment.

Operation 620: Obtain a similarity degree between a second feature representation and the initial cluster center, and determine a first cluster distribution result based on the similarity degree between the second feature representation and the initial cluster center, the first cluster distribution result including feature distribution corresponding to each initial cluster center.

The first cluster distribution result includes feature distribution corresponding to each initial cluster center.

Through operation 610, after the initial cluster center $\{\mu_j\}_{j=1}^k$ is obtained, clustering analysis is performed on a second user in the platform based on the initial cluster center, to find a cluster to which each user belongs.

For example, the similarity degree between the second feature representation of the second user and the initial cluster center is obtained in a manner of Student's T-distribution, a probability that the second user belongs to a cluster is obtained based on the similarity degree, and a cluster with a largest probability value and the initial cluster center are used as an initial classification result of the second user, to jointly form the first cluster distribution result.

In probability theory and statistics, the Student's T-distribution is T-distribution, and is configured for estimating a mean value of an entirety with normal distribution and unknown variance based on a small sample. If the variance of the entirety is known (for example, when a quantity of samples is sufficient), the normal distribution needs to be used to estimate the mean value of the entirety.

For example, as shown in the following Formula 1:

$$q_{ij} = \frac{\left(1 + |h_i - \mu_j|^2/\alpha\right)^{-\frac{\alpha+1}{2}}}{\sum_{j'}\left(1 + |h_i - \mu_{j'}|^2/\alpha\right)^{-\frac{\alpha+1}{2}}} \qquad \text{Formula 1}$$

$q_{ij}$ refers to a probability that the second user belongs to a cluster, $h_i$ refers to the second feature representation of the second user, $\mu_j$ refers to the initial cluster center, $\alpha$ represents a freedom degree of the Student's T-distribution, and $\mu_{j'}$ refers to any initial cluster center.

For example, the first user and the second user are as an example, the second feature representation corresponding to the first user and the second user is $h_1$, and similarity degree calculation is performed on the second feature representation $h_1$ corresponding to the first user and second user and the initial cluster center $\{\mu_j\}_{j=1}^k$ one by one, to obtain a similarity degree array array1[$j$] corresponding to the first user and the second user, where $j=1, 2, 3, \ldots, K$.

Summation is performed on all similarity degree values in the similarity degree array array1[$j$], to obtain a similarity degree sum, and each similarity degree value in the similarity degree array array1[$j$] is divided by the similarity degree sum, to obtain a probability $q_{ij}$ that the first user and the second user belong to each cluster. A cluster with a largest probability value is used as the cluster corresponding to the first user and the second user, and an initial cluster center corresponding to the cluster is also the initial cluster center corresponding to the first user and the second user.

The foregoing operations are repeatedly performed on each second user, to obtain the cluster to which each second user belongs, to jointly form the first cluster distribution result.

In some embodiments, a manner of obtaining the similarity degree between the second feature representation of the second user and the initial cluster center may be arbitrary, including but not limited to the foregoing manner based on the Student's T-distribution. A manner of obtaining the probability that each user belongs to the cluster may be arbitrary. This is not limited in this embodiment.

Operation 630: Perform discrete analysis on the first cluster distribution result, to obtain a second cluster distribution result, and determine a plurality of clusters based on the second cluster distribution result, the second cluster distribution result including a cluster center corresponding to each second feature representation.

The second cluster distribution result includes the cluster center corresponding to each second feature representation.

The first cluster distribution result obtained through operation 620 has low confidence, and the probability that each second user belongs to the corresponding cluster is low. To obtain a sharper cluster distribution result, in other words, to make the second feature representation of each second user closer to a respectively corresponding initial cluster center, it is necessary to set a target cluster distribution result with higher confidence, and the first cluster distribution result is closer to the target cluster distribution result through discrete analysis processing.

The performing discrete analysis processing on the first cluster distribution result includes the following operations.

(1) Perform discrete analysis on feature distribution corresponding to an $i^{th}$ initial cluster center in the first cluster distribution result, to obtain a discrete value corresponding to the $i^{th}$ initial cluster center.

(2) Update the $i^{th}$ initial cluster center based on the discrete value corresponding to the $i^{th}$ initial cluster center, to obtain the second cluster distribution result; and update a feature extraction network, the feature extraction network being configured for extracting a feature representation of a user.

(3) Obtain the plurality of clusters based on the second cluster distribution result and an updated feature extraction network.

For example, as shown in the following Formula 2:

$$p_{ij} = \frac{q_{ij}^2/f_j}{\sum_{j'} q_{ij'}^2/f_{j'}} \qquad \text{Formula 2}$$

$p_{ij}$ refers to an updated probability that the second user belongs to a cluster, that is, the target cluster distribution result, and $f_j = \sum_i q_{ij}$ represents a probability that the second user belongs to a $j^{th}$ cluster center.

For example, a Kullback-Leibler divergence (KL divergence) is used, to make the first cluster distribution result closer to the target cluster distribution result, as shown in the following Formula 3:

$$L_{clustering} = KL(P\|Q) = \sum_i \sum_j p_{ij} \log\frac{p_{ij}}{q_{ij}} \qquad \text{Formula 3}$$

P represents the target cluster distribution result, Q represents the first cluster distribution result, and $L_{clustering}$ refers to the KL divergence.

The target cluster distribution result is the second cluster distribution result. After the second cluster distribution result is obtained based on the foregoing operations, the plurality of clusters are obtained based on the second cluster distribution result, and each cluster corresponds to a respective corresponding cluster center.

Figure 7:
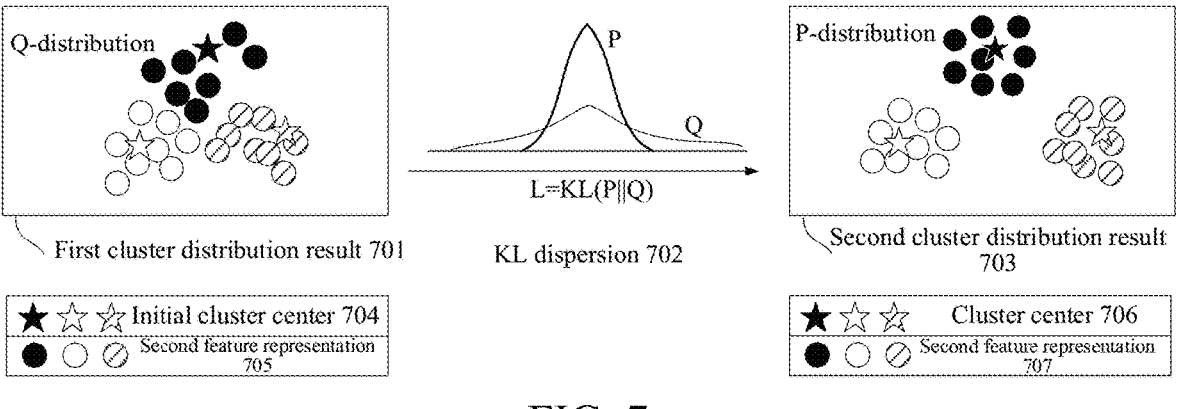
FIG. 7 is a schematic diagram of obtaining a second cluster distribution result after discrete analysis processing is performed on a first cluster distribution result according to an example of this disclosure.

For example, as shown in FIG. 7, FIG. 7 is a schematic diagram of obtaining a second cluster distribution result after discrete analysis processing is performed on a first cluster distribution result.

A first cluster distribution result 701 includes a cluster formed based on a plurality of initial cluster centers. After discrete analysis is performed on the first cluster distribution result 701 based on a KL divergence 702, a second cluster distribution result 703 with higher confidence is obtained.

The first cluster distribution result 701 includes an initial cluster center 704 and a second feature representation 705 belonging to a same cluster as the initial cluster center 704. A distance between the initial cluster center 704 and the second feature representation 705 is large, so that the formed cluster is scattered.

The second cluster distribution result 703 includes a cluster center 706 and an updated second feature representation 707 belonging to a same cluster as the cluster center 706. A distance between the cluster center 706 and the updated second feature representation 707 is close, so that the formed cluster is compact.

In conclusion, in the method provided in this disclosure, clustering analysis is performed on all users in the first function platform, to obtain the cluster to which each user belongs and a cluster center corresponding to each user, and a personalized mapping relationship function is obtained based on the cluster center. The personalized mapping relationship function can implement a mapping process from an outside-domain feature representation to an intra-domain feature representation for different users, so that accuracy of a mapping result is improved. The first feature representation of the first user, and the outside-domain feature representation that is obtained through feature extraction performed on the historical interaction data of the first user in the second function platform are obtained. The cluster center corresponding to the first user is found based on the first feature representation. The mapping relationship function corresponding to the first user is obtained based on the cluster center corresponding to the first user. The outside-domain feature representation of the first user is input to the mapping relationship function. The intra-domain feature representation of the first user is obtained through mapping. Therefore, personalized content in the first function platform is recommended to the first user based on the intra-domain feature representation and the first feature representation of the first user, so that a cold user problem and a data sparseness problem are solved, the recommended content is more consistent with a real interest of the first user, a recommendation effect is improved, and a resource supporting a content pushing function is not wasted.

In the method provided by this embodiment, position information of the initial cluster center is obtained through random initialization, clustering analysis is performed on all the users in the first function platform based on the initial cluster center, to obtain a first clustering analysis result, and discrete analysis is performed on the first clustering analysis result. Therefore, the second cluster distribution result with higher confidence can be obtained, the cluster to which each user belongs and the corresponding cluster center are found, all the users can be accurately classified, and the personalized mapping function is further found based on a classification result, so that the mapping result is more accurate.

In the method provided by this embodiment, discrete analysis is performed on each cluster in the first cluster distribution result, to obtain a discrete value corresponding to each initial cluster center. The initial cluster center is updated based on the discrete value, to obtain the second cluster distribution result with higher confidence. The feature extraction network is updated, to obtain a more accurate second feature representation and a relationship between each second feature representation and the cluster to which the second feature representation belongs.

Figure 8:
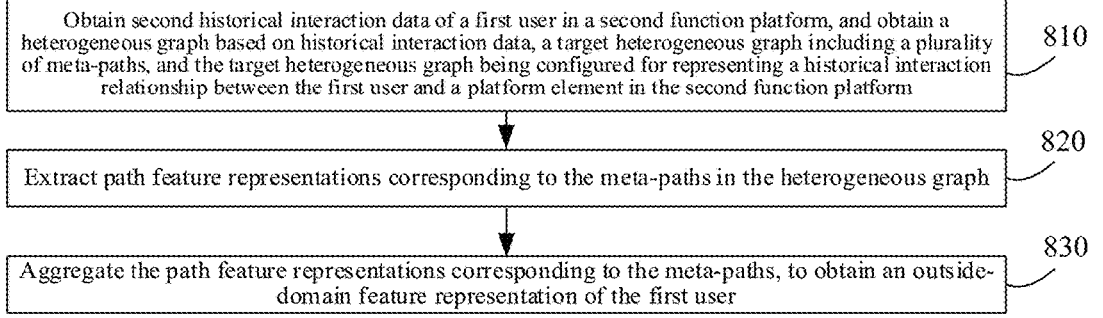
FIG. 8 is a flowchart of a method for obtaining an outside-domain feature representation of a first user according to an example of this disclosure.

When the outside-domain feature representation or the intra-domain feature representation of the user is extracted based on the historical interaction data of the user in any function platform, a heterogeneous graph needs to be introduced to obtain the historical interaction data, and further extract the intra-domain or outside-domain feature representation of the user. As shown in FIG. 8, FIG. 8 is a flowchart of a method for obtaining the outside-domain feature representation of the first user. Specifically, the obtaining second historical interaction data of the first user in a second function platform, extracting a feature based on historical interaction data, and obtaining the outside-domain feature representation of the first user includes the following operations.

Operation 810: Obtain the second historical interaction data of the first user in the second function platform, and obtain a heterogeneous graph based on the historical interaction data, a target heterogeneous graph including a plurality of meta-paths, and the target heterogeneous graph being configured for representing a historical interaction relationship between the first user and a platform element in the second function platform.

The target heterogeneous graph includes the plurality of meta-paths, and the target heterogeneous graph is configured for representing the historical interaction relationship between the first user and the element in the second function platform.

The heterogeneous graph is also referred to as a heterogeneous network. In the heterogeneous graph, a type of a node and a type of an edge are not single, but diversified.

The meta-path may be understood as a path connecting nodes of different types. Different meta-paths have different path types. The path type is usually represented by a node type path.

Figure 9:
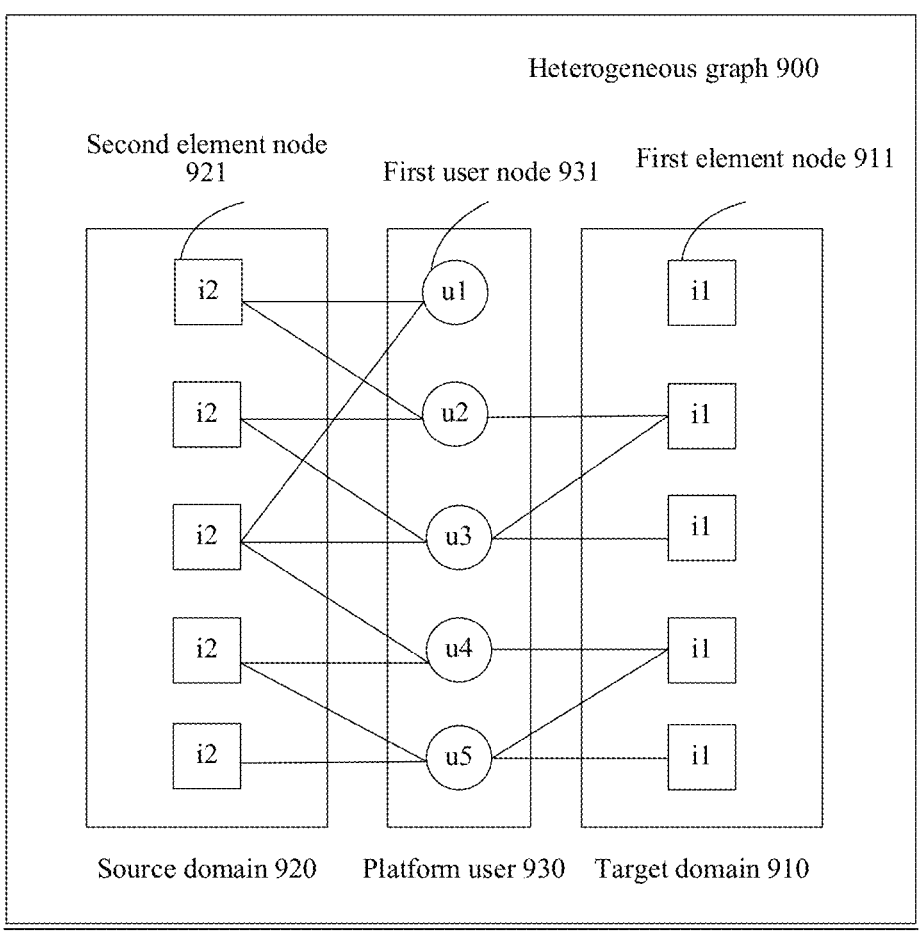
FIG. 9 is a schematic diagram of a heterogeneous graph according to an example of this disclosure.

For example, as shown in FIG. 9, FIG. 9 is a schematic diagram of a heterogeneous graph.

A heterogeneous graph 900 includes a target domain 910, a source domain 920, and a platform user 930.

In this embodiment of this disclosure, the target domain 910 refers to a first function platform, the source domain 920 refers to the second function platform, and the platform user 930 includes the first user and the second user. The first user is represented as a first user node 931 in the heterogeneous graph 900.

There are a plurality of first platform elements in the target domain 910, and the first platform element is represented as a first element node 911 in the heterogeneous graph 900. There are also a plurality of second platform elements in the source domain 920, and the second platform element is represented as a second element node 921 in the heterogeneous graph 900.

Types of the first element node 911, the second element node 921, and the first user node 931 are different.

The meta-path in the heterogeneous graph 900 indicates that historical interaction data exists between the first user and the second platform element in the second function platform. To be specific, the first user node 931 and the second element node 921 are connected via a straight line, indicating that there is an interaction relationship between the first user node 931 and the second element node 921. The first user node 931, the second element node 921, and the straight line for connecting the first user node 931 and the second element node 921 jointly form the meta-path belonging to the heterogeneous graph 900 in which the first user is located.

The meta-path generated based on the historical interaction data in the source domain 920 by using the first user node 931 as a center includes, but is not limited to, the following paths.

(1) u1-i2;

(2) u1-i2-u2;

(3) u1-i2-u2-i2-u3;

(4) u1-i2-u4; and (5) u1-i2-u2-i2-u5.

u1 refers to the first user node 931, i2 is the second element node 921 in the source domain 920, and u2, u3, u4, and u5 represent user nodes corresponding to second users in the platform users 930.

i2 is a first-order neighbor of u1, u2 and u4 are second-order neighbors of u1, and the rest can be deduced by analogy. A quantity of nodes that need to be passed by u1 to reach a target node is N, so that the target node is an $(N-1)^{th}$-order neighbor of u1. The target nodes that can be reached through the meta-paths by using u1 as the center are all neighbor nodes of u1. The target node is a specific node.

In addition to the meta-path that uses the first user node 931 as the center, the heterogeneous graph 900 further includes a target heterogeneous graph jointly formed by a meta-path that uses the user node corresponding to the second user in the platform user 930 as a center and a meta-path that uses the first user node 931 as the center jointly form the target heterogeneous graph, that is, the target heterogeneous graph is a part of the heterogenous graph 900.

A quantity and types of the meta-paths included in the heterogeneous graph may be arbitrary, quantities of nodes and edges included in the heterogeneous graph may be arbitrary, types of the nodes may be arbitrary, quantities of nodes and edges included in the meta-path may be arbitrary, and order numbers and a quantity of neighbor nodes of the center node in the meta-path may be arbitrary. This is not limited in this embodiment.

In some embodiments, a quantity and types of user nodes included in the target heterogeneous graph may be arbitrary, a quantity and types of source domains may be arbitrary, and a quantity and types of target domains may be arbitrary. A platform that may be used as the source domain includes, but is not limited to, the second function platform. A quantity and types of first element nodes in the first function platform may be arbitrary, and a quantity and types of second element nodes in the second function platform may be arbitrary. This is not limited in this embodiment.

Operation 820: Extract path feature representations corresponding to the meta-paths in the heterogeneous graph.

The path feature representations of the meta-paths are extracted, and feature extraction is performed on each meta-path in the target heterogeneous graph by using a graph attention network as an aggregation mechanism.

A graph neural network (GNN) refers to a general term of algorithms for learning graph structural data through a neural network, extracting and exploiting features and patterns in the graph structural data, and satisfying requirements of graph learning tasks such as clustering, classification, prediction, segmentation, and generation.

In this embodiment, the target heterogeneous graph is analyzed by using the graph neural network.

The graph attention network (GAT) is a graph neural network. In the network, attention of a node relative to each neighbor node in a graph is calculated in a manner similar to self-attention in a transformer, a feature and an attention feature of the node are concatenated as a feature of the node, and a task such as classification of the node is performed on this basis.

The second historical interaction data of the first user in the second function platform is represented in the target heterogeneous graph in the form of meta-path. Each meta-path has semantic information, and is configured for representing a characteristic and an interest bias of interaction of the first user in the second function platform.

In the target heterogeneous graph, there are different types of meta-paths. For the different types of meta-paths, convolution of the heterogeneous graph is used to capture rich semantic information included in each meta-path, and a node-level attention mechanism is added to distinguish importance of each neighbor node to a center node (the first user node).

In some embodiments, the extracting a path feature representation corresponding to the meta-path in the heterogeneous graph includes: obtaining node attention of each path node in the meta-path, the path node being configured for representing a platform element having a historical interaction relationship with the first user; and performing aggregation processing on the node attention, to obtain the path feature representation of the meta-path.

Figure 10:
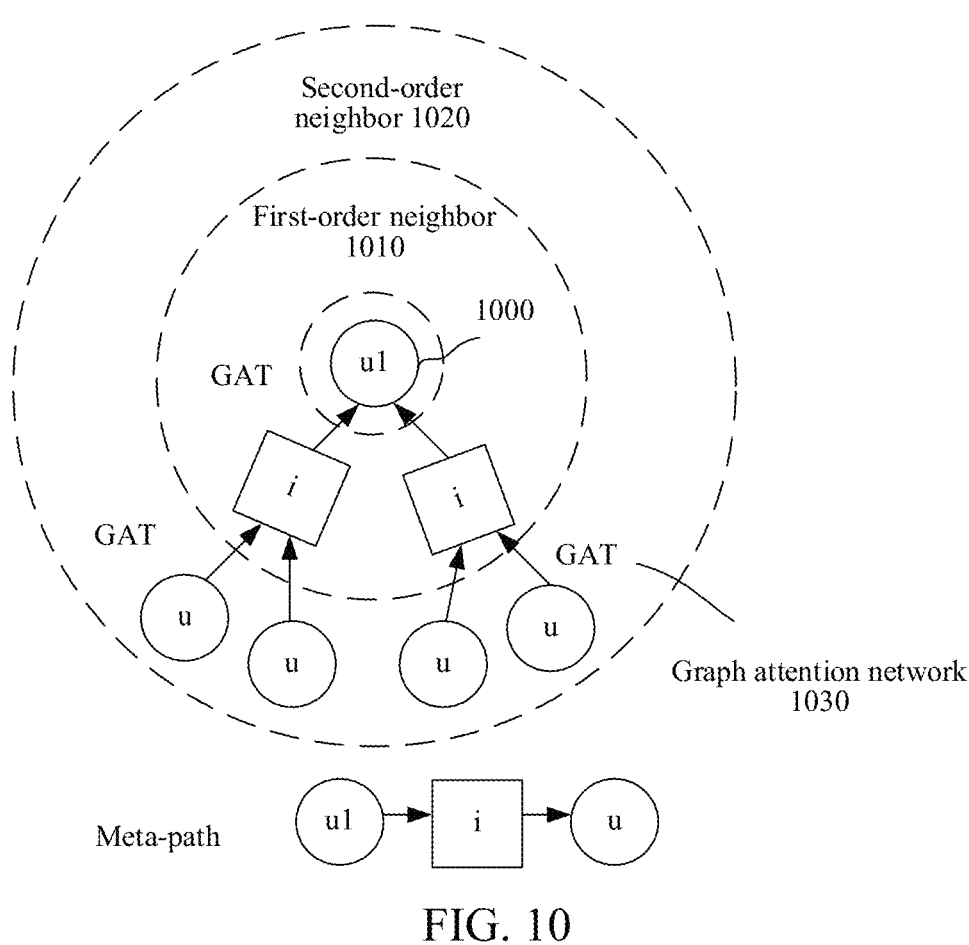
FIG. 10 is a schematic diagram of convolution of a heterogeneous graph based on a meta-path according to an example of this disclosure.

For example, as shown in FIG. 10, FIG. 10 is a schematic diagram of convolution of a heterogeneous graph based on a meta-path.

A first user node 1000 corresponding to a first user is used as a center, and a first-order neighbor node 1010 and a second-order neighbor node 1020 of the first user node 1000 are obtained in the meta-path in sequence.

An order of obtaining node attention of each neighbor node is opposite to an order of obtaining the neighbor node.

Node attention of the second-order neighbor node 1020 is first obtained based on a graph attention network 1030, then node attention of the first-order neighbor node 1010 is obtained, and node attention of the first user node 1000 is finally obtained.

After the node attention of all nodes is obtained, aggregation processing is first performed on the node attention of the second-order neighbor node 1020, to obtain an embedding of the first-order neighbor node 1010, and then aggregation processing is performed on the node attention of the first-order neighbor node 1010, to obtain an embedding of the first user node 1000.

Each neighbor node (the first-order neighbor node 1010 and the second-order neighbor node 1020) has different importance degrees to a center node (the first user node 1000). After the node attention of each neighbor node is aggregated, a node representation is finally formed, for example, as shown in the following Formula 4:

$$a_{ui} = \frac{\exp\left(LeakyReLU\left(a^T[Whu\|Whi]\right)\right)}{\sum_{k \in Nu} \exp\left(LeakyReLU\left(a^T[Whu\|Whk]\right)\right)}, \qquad \text{Formula 4}$$

$$\forall \in Nu$$

$\alpha_{ui}$ represents a correlation between a node u and a node i, $h_u$ and $h_i$ represent representations of the node u and the node i, and $N_u$ represents a neighbor set of the node u.

Each meta-path has a plurality of nodes, and corresponds to a plurality of node representations. All node representations on the meta-path are aggregated, to obtain the path feature representation of the meta-path, for example, as shown in the following Formula 5:

$$h'u = \sigma\left(\sum_{i \in Nu} a_{ui}hi + hu\right) \qquad \text{Formula 5}$$

h'u represents the path feature representation of the meta-path, and $\sigma(\cdot)$ represents an activation function.

The foregoing examples only relate to the first-order neighbor node and the second-order neighbor node. In some embodiments, a node order of the meta-path may be arbitrary. When attention analysis is performed on the neighbor node, to obtain the node attention, attention analysis may be performed on only a specified neighbor node, or attention analysis may be performed on all neighbor nodes. A method used when attention analysis is performed and node attention is obtained may be arbitrary, including but not limited to, the foregoing manner of the graph attention network. This is not limited in this embodiment.

Operation 830: Aggregate the path feature representations corresponding to the meta-paths, to obtain the outside-domain feature representation of the first user.

Aggregation processing is performed on the path feature representation of the meta-path based on the meta-path obtained from the second historical interaction data of the first user in the second function platform, to obtain the outside-domain feature representation of the first user. An outside-domain refers to a source domain, to be specific, an area other than the first function platform. In some embodiments, the outside-domain may be an area of any function platform. However, the first user has historical interaction data in the source domain, and the historical interaction data reflects an interaction characteristic and an interest bias of the first user in the source domain.

A quantity of meta-paths included in the target heterogeneous graph corresponding to the first user is at least one. In the method in operation 820, feature extraction is performed on the convolution of the heterogeneous graph for each meta-path based on the meta-path, to obtain a plurality of path feature representations. After mean-pooling processing is performed on the path feature representations of the plurality of meta-paths, the feature representation of the first user in the second function platform, that is, the outside-domain feature representation of the first user is obtained.

An idea of pooling is from a visual mechanism, and is a process of abstracting information. An essence of the pooling is sampling. A pooling layer selects a manner for an input feature map, to perform dimensional reduction compression on the input feature map, to increase an operation speed.

There are several pooling processes, including max pooling, mean-pooling, and the like.

The mean-pooling may be understood as performing mean processing on content of an input pooling layer.

For example, assuming that a quantity of path feature representations input to the pooling layer is 100, and is represented in a form of 10*10 grids, each path feature representation corresponds to one grid. A 10*10 grid is compressed into a 2*2 large grid, to be specific, 100 grids are divided into four groups, and each group includes 25 grids. The path feature representation in each group of the grids is averaged, and the average value is used to represent a path feature representation corresponding to each large grid. This is the mean-pooling process.

In operation 810 to operation 830, the first user is used as an example. The outside-domain feature representation of the first user is obtained. In some embodiments, when the first user has the historical interaction data in another domain, that is, another function platform, the outside-domain feature representation or the intra-domain feature representation of the first user in another function platform may also be obtained based on the foregoing methods of operation 810 to operation 830.

Any domain may be used as a target domain, and any domain may be used as the source domain. Methods for obtaining the intra-domain feature representation and the outside-domain feature representation are the same and are applicable to each user, including but not limited to, the first user and the second user.

Both the intra-domain feature representation and the outside-domain feature representation are configured for representing the interest feature and the interaction feature of a current user in a domain. Generally, a domain having sparser historical interaction data with the current user or a domain having no historical interaction data is used as the target domain. A domain in which the historical interaction data exists or a large amount of historical interaction data exists is used as the source domain.

The content recommendation method provided in this disclosure includes three parts in total.

(1) A learning process of content recommendation for the sample user in the target domain, relating to a recommendation loss ($L_{rec}$).

(2) A learning process of clustering based on the sample feature representation of the sample user, relating to a clustering loss ($L_{clustering}$).

(3) A learning process of converting the sample outside-domain feature representation of the sample user into the intra-domain mapping feature based on the mapping relationship function, and using the intra-domain mapping feature to approximate the intra-domain feature representation, relating to a reconstruction loss ($L_{reconstruction}$).

A learning process of content recommendation for the sample user involves a personalized recommendation module.

In some embodiments, before content recommendation is performed on the first user based on a similarity degree matching result, the personalized recommendation module needs to be trained based on a loss between recommended target content and content that the user is interested in, for example, as shown in the following Formula 6:

$$L_{rec} = -\sum_{(u,vi) \in S+} \sum_{(u,vi) \in S-} \log \sigma\left(hu^T hvi - hu^T hvj\right) \qquad \text{Formula 6}$$

hu is a representation of a user u, hvi is a representation of a positive sample vi of the user u, hvj is a representation of a negative sample vj of the user u, $\sigma$ represents an activation function, and $L_{rec}$ is a recommended loss.

The personalized recommendation mechanism is trained based on the recommendation loss, so that when similarity degree matching is performed based on the intra-domain feature representation of the first user and an element in a candidate content recommendation pool, a similarity degree matching result can accurately represent content that the first user actually interests in, and content recommendation is performed on the first user.

In some embodiments, training is stopped when the recommendation loss satisfies any one of the following conditions.

(1) The reconstruction loss is lower than a preset threshold. (2) The reconstruction loss converges.

The foregoing three operations use a joint training manner, in other words, training of the processes based on the recommendation loss, the clustering loss, and the reconstruction loss is synchronized.

A manner of training the personalized recommendation module based on the recommendation loss may be arbitrary, and a condition for determining that training is stopped may be arbitrary. This is not limited in this embodiment.

In conclusion, in the method provided in this disclosure, the historical interaction data of the first user in the second function platform is represented in the form of the heterogeneous graph, so that the characteristic of the interaction between the first user and the second function platform can be directly observed, and each piece of historical interaction data is represented based on the meta-path in the heterogeneous graph. The interest bias of the first user in the second function platform is obtained based on the path feature representation of the meta-path, and the outside-domain feature representation of the first user is further obtained, so that a reliable basis for feature mapping is provided, accuracy of feature migration is improved, and an effect of obtaining the intra-domain feature representation based on the outside-domain feature representation and recommending the personalized content to the first user is improved.

In the method provided in this embodiment, the target heterogeneous graph is obtained through the second historical interaction data of the first user in the second function platform, and the target heterogeneous graph includes the plurality of meta-paths, so that a historical interaction relationship between the first user and the element in the second function platform can be represented directly and concisely. The path feature representation corresponding to the meta-path in the target heterogeneous graph is extracted, and aggregation processing is performed on the path feature representation corresponding to the meta-path, to obtain high accuracy of the outside-domain feature representation of the first user.

In the method provided in this embodiment, attention analysis is performed on the path node of each meta-path in the heterogeneous graph through the graph attention network, to obtain the attention representation of each path node, an importance degree of each path node to the center node is obtained based on the attention representation of the path node, the node attention of each path node in the meta-path is aggregated, and a path feature representation of an entire meta-path is obtained, so that the characteristic of the interaction of the first user in the second function platform and the interest bias of the first user in the second function platform can be learned. Therefore, the outside-domain feature representation obtained based on the path feature representation of the meta-path reflects the interest characteristic of the first user in the second function platform more accurately.

Figure 11:
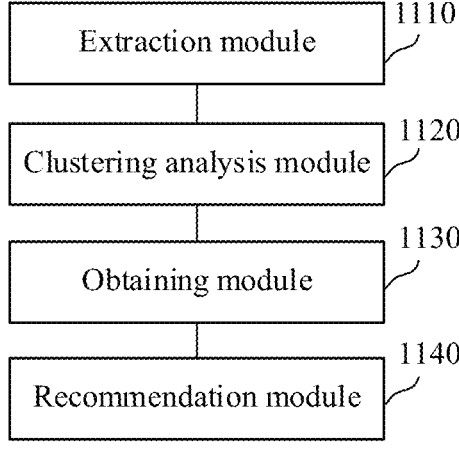
FIG. 11 is a block diagram of a structure of a content recommendation apparatus according to an example of this disclosure.

FIG. 11 is a block diagram of a structure of a content recommendation apparatus according to an example of this disclosure. As shown in FIG. 11, the apparatus includes: an extraction module, a clustering analysis module, an obtaining module, and a recommendation module.

The extraction module 1110 is configured to: obtain attribute data of a first user in a first function platform, and extract a feature based on the attribute data, to obtain a first feature representation of the first user;

The clustering analysis module 1120 is configured to: obtain a second feature representation of a second user in the first function platform, and perform clustering analysis on the first feature representation and the second feature representation, to obtain a cluster center corresponding to the first user;

The extraction module 1110 being further configured to: obtain second historical interaction data of the first user in a second function platform, and extract a feature based on the second historical interaction data, to obtain an outside-domain feature representation of the first user;

The obtaining module 1130 is configured to: obtain a mapping relationship function corresponding to the cluster center, and map the outside-domain feature representation by using the mapping relationship function, to obtain an intra-domain feature representation of the first user, the mapping relationship function being configured for indicating a mapping relationship between feature representations in the second function platform and the first function platform; and The recommendation module 1140 is configured to: determine a target feature representation of the first user based on the intra-domain feature representation and the first feature representation, determine, from a candidate content recommendation pool based on the target feature representation, target content matching the first user, and push the target content to the first user.

Figure 12:
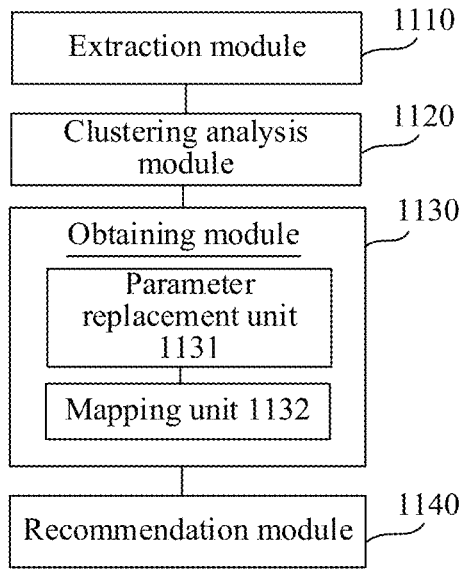
FIG. 12 is a block diagram of a structure of a content recommendation apparatus according to an example of this disclosure.

In an example, as shown in FIG. 12, the obtaining module 1130 further includes:

a parameter replacement unit 1131, configured to perform parameter replacement on a pre-generated parameter-containing mapping function based on the cluster center corresponding to the first user, to obtain a mapping relationship function corresponding to the cluster center; and a mapping unit 1132, configured to map the outside-domain feature representation by using the mapping relationship function, to obtain the intra-domain feature representation of the first user.

In an example, the parameter replacement unit 1131 is further configured to: obtain the parameter-containing mapping function, the parameter-containing mapping function including a specified parameter position in a to-be-filled state; and substitute the cluster center as a parameter into the specified parameter position, to obtain the mapping relationship function corresponding to the cluster center, the cluster center being used as a search keyword to query the mapping relationship function.

In an example, the obtaining module 1130 is further configured to: obtain first historical interaction data of a sample user in the first function platform, and extract a feature based on the first historical interaction data, to obtain a sample intra-domain feature representation of the sample user, the sample user corresponding to a sample cluster center; obtain second historical interaction data of the sample user in the second function platform, and extract a feature based on the second historical interaction data to obtain a sample outside-domain feature representation of the sample user; obtain a candidate mapping function, input the sample outside-domain feature representation of a sample user to the candidate mapping function, and obtain, through mapping, a sample intra-domain mapping feature corresponding to the sample user; obtain a reconstruction loss based on the sample intra-domain feature representation and the sample intra-domain mapping feature of the sample user; and train the candidate mapping function based on the reconstruction loss, to obtain a mapping relationship function corresponding to the sample cluster center.

In an example, the clustering analysis module 1120 is further configured to: obtain attribute data of the second user in the first function platform, and extract a feature based on the attribute data of the second user, to obtain the second feature representation of the second user; perform clustering analysis on the second user based on the second feature representation, to obtain a plurality of clusters, each cluster including a cluster center; obtain a similarity degree between the first feature representation and the cluster center, and determine, based on the similarity degree, the cluster center corresponding to the first user.

In an example, the clustering analysis module 1120 is further configured to: obtain clustering information, the clustering information being configured for indicating position information of an initial cluster center; obtain a similarity degree between the second feature representation and the initial cluster center; determine a first cluster distribution result based on the similarity degree between the second feature representation and the initial cluster center, the first cluster distribution result including feature distribution corresponding to each initial cluster center; and perform discrete analysis on the first cluster distribution result, to obtain a second cluster distribution result, and determining the plurality of clusters based on the second cluster distribution result, the second cluster distribution result including a cluster center corresponding to each second feature representation.

In an example, the clustering analysis module 1120 is further configured to: perform discrete analysis on feature distribution corresponding to an $i^{th}$ initial cluster center in the first cluster distribution result, to obtain a discrete value corresponding to the $i^{th}$ initial cluster center; update the $i^{th}$ initial cluster center based on the discrete value corresponding to the $i^{th}$ initial cluster center, to obtain the second cluster distribution result; update a feature extraction network, the feature extraction network being configured for extracting a feature representation of a user; and obtain the plurality of clusters based on the second cluster distribution result and an updated feature extraction network.

In an example, the clustering analysis module 1120 is further configured to: calculate a distance between the first feature representation and each cluster center, and use a cluster center at a smallest distance from the first feature representation as the cluster center corresponding to the first user.

In an example, the clustering analysis module 1120 is further configured to: calculate the similarity degree between the first feature representation and each cluster center; determine, based on the similarity degree, a probability that the first user belongs to each cluster center based on the similarity degree; filter out a maximum probability from the determined probability, and determine, based on the maximum probability, the cluster center corresponding to the first user.

In an example, the extraction module 1110 is further configured to: obtain the second historical interaction data of the first user in the second function platform, and obtaining a heterogeneous graph based on the historical interaction data, a target heterogeneous graph including a plurality of meta-paths, and the target heterogeneous graph being configured for representing a historical interaction relationship between the first user and a platform element in the second function platform; extract path feature representations corresponding to the meta-paths in the heterogeneous graph; and aggregate the path feature representations corresponding to the meta-paths, to obtain the outside-domain feature representation of the first user.

In an example, the extraction module 1110 is further configured to: obtain node attention of all path nodes in the meta-paths, the path node being configured for representing the platform element having the historical interaction relationship with the first user; and perform aggregation processing on the node attention, to obtain the path feature representations of the meta-paths.

In conclusion, in the apparatus provided in this embodiment, clustering analysis is performed on all users in the first function platform, to obtain the cluster to which each user belongs and a cluster center corresponding to each user, and a personalized mapping relationship function is obtained based on the cluster center. The personalized mapping relationship function can implement a mapping process from an outside-domain feature representation to an intra-domain feature representation for different users, so that accuracy of a mapping result is improved. At least one of the first feature representation or the second feature representation of the first user and the outside-domain feature representation that is obtained through feature extraction performed on the historical interaction data of the first user in the second function platform are obtained. The cluster center corresponding to the first user is found based on the first feature representation and the second feature representation. The mapping relationship function corresponding to the first user is obtained based on the cluster center corresponding to the first user. The outside-domain feature representation of the first user is input to the mapping relationship function. The intra-domain feature representation of the first user is obtained through mapping. An interaction characteristic of the first user in the first function platform is obtained when the first user has the historical interaction data in only the second function platform and does not have the historical interaction data in the first function platform. Therefore, personalized content in the first function platform is recommended to the first user based on the intra-domain feature representation and the first feature representation of the first user, so that a cold user problem and a data sparseness problem are solved, the recommended content is more consistent with a real interest of the first user, a recommendation effect is improved, and a resource supporting a content pushing function is not wasted.

The content recommendation apparatus provided in the foregoing embodiment is merely described by using the division of the foregoing functional modules as an example. In an example, the functions may be allocated to and completed by different functional modules according to requirements. In other words, an internal structure of the device is divided into different functional modules, to complete all or some of the functions described above.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module.

Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Figure 13:
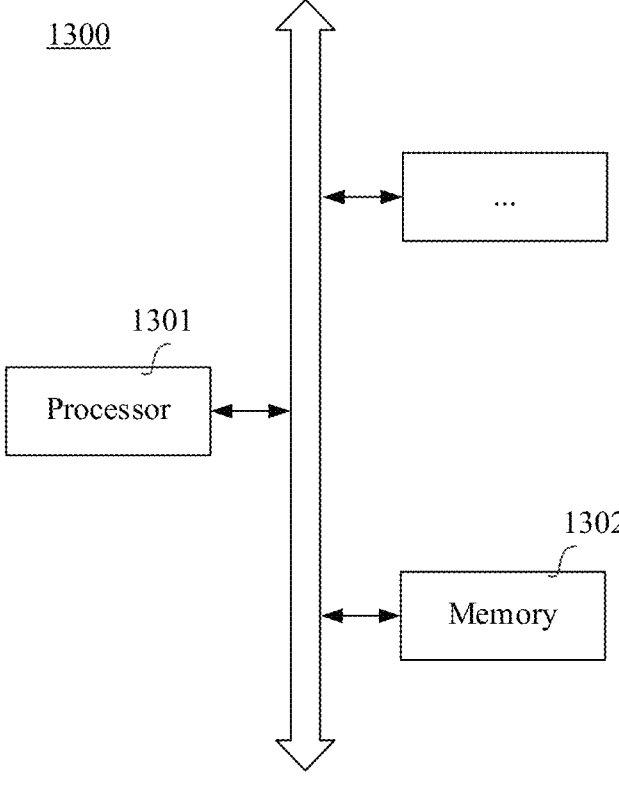
FIG. 13 is a block diagram of a structure of a computer device according to an example of this disclosure.

FIG. 13 is a block diagram of a structure of a computer device 1300 according to an example of this disclosure. The computer device 1300 may be a notebook computer or a desktop computer. The computer device 1300 may also be referred to as another name such as user equipment, a portable terminal, a laptop terminal, or a desktop terminal.

Generally, the computer device 1300 includes a processor 1301 and a memory 1302.

Processing circuitry, such as the processor 1301 may include one or more processing cores, such as a 4-core processor and an 8-core processor. The processor 1301 may be implemented in at least one hardware form of a digital signal processor (DSP), a field-programmable gate array (FPGA), and a programmable logic array (PLA). The processor 1301 may also include a main processor and a co-processor. The main processor is a processor configured to process data in an awake state, and is also referred to as a central processing unit (CPU). The co-processor is a low power consumption processor configured to process the data in a standby state. In some embodiments, the processor 1301 may be integrated with a graphics processing unit (GPU). The GPU is configured to render and draw content that needs to be displayed on a display. In some embodiments, the processor 1301 may further include an AI processor. The AI processor is configured to process a computing operation related to machine learning.

The memory 1302, such as a non-transitory computer-readable storage medium, may include one or more computer-readable storage media. The computer-readable storage medium may be non-transient. The memory 1302 may also include a high-speed random access memory, a non-volatile memory, such as one or more disk storage devices and flash storage devices. In some embodiments, a non-transitory computer-readable storage medium in the memory 1302 is configured to store at least one instructions, and the at least one instructions are configured to be executed by the processor 1301, to implement the content recommendation method provided in the embodiments of this disclosure.

In some embodiments, the computer device 1300 further includes other components. A person skilled in the art may understand that the structure shown in FIG. 13 does not constitute a limitation on the computer device 1300, and the terminal may include more or fewer components than those shown in the figure, or combine some components, or have different component deployment.

Embodiments of this disclosure further provide a computer device. The computer device includes a processor and a memory, the memory having at least one instruction stored therein, a computer-readable instruction, a code set, or an instruction set, the at least one instruction, the computer-readable instruction, the code set, or the instruction set being loaded and executed by the processor to implement the content recommendation method according to the foregoing method embodiments.

Embodiments of this disclosure further provide a non-transitory computer-readable storage medium, the non-transitory computer-readable storage medium having at least one instruction stored therein, a computer-readable instruction, a code set, or an instruction set, the at least one instruction, the computer-readable instruction, the code set, or the instruction set being loaded and executed by a processor to implement the content recommendation method according to the foregoing method embodiments.

Embodiments of this disclosure further provide a computer program product or a computer program, the computer program product or the computer program including computer instructions, and the computer instructions being stored in a computer-readable storage medium. A processor of a computer device reads the computer instructions from the computer-readable storage medium, and the processor executes the computer instructions, to cause the computer device to perform the content recommendation method according to any one of the foregoing embodiments.

In some embodiments, the computer-readable storage medium may include: a read only memory (ROM), a random access memory (RAM), a solid state drive (SSD), an optical disc, or the like. The RAM may include a resistance random access memory (ReRAM) and a dynamic random access memory (DRAM). Sequence numbers of the foregoing embodiments of this disclosure are merely for description, and do not indicate superiority or inferiority of the embodiments.

A person of ordinary skill in the art may understand that all or some of the operations of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The above mentioned descriptions are merely examples of embodiments of this disclosure, and are not intended to limit this disclosure. Any modification, equivalent replacement, or improvement made without departing from the spirit and principle of this disclosure falls within the protection scope of this disclosure.

What is claimed is:

1. A content recommendation method, the method comprising:

obtaining a first feature representation of a first user in a first function platform, wherein the first feature representation of the first user is extracted from attribute data of the first user;

obtaining a second feature representation of a second user in the first function platform, wherein the second feature representation of the second user is extracted from attribute data of the second user;

determining a cluster center corresponding to the first user based on the first feature representation and the second feature representation;

obtaining an extra-domain feature representation of the first user in a second function platform, wherein the extra-domain feature representation of the first user is extracted from first historical interaction data of the first user in the second function platform;

obtaining a mapping relationship function corresponding to the cluster center, wherein the mapping relationship function indicates a feature representation relationship between the second function platform and the first function platform;

determining an intra-domain feature representation of the first user, wherein the intra-domain feature representation is based on mapping the extra-domain feature representation with the mapping relationship function;

determining a target feature representation of the first user based on the intra-domain feature representation and the first feature representation;

determining, by processing circuitry and from a candidate content recommendation pool, target content that matches the target feature representation of the first user; and pushing the target content to the first user.

2. The method according to claim 1, wherein the obtaining the mapping relationship function further comprises:

performing parameter replacement on a pre-generated parameter-containing mapping function to obtain the mapping relationship function corresponding to the cluster center.

3. The method according to claim 2, wherein the performing the parameter replacement further comprises:

obtaining the pre-generated parameter-containing mapping function, the pre-generated parameter-containing mapping function including a to-be-filled parameter position; and replacing the cluster center with the to-be-filled parameter position to obtain the mapping relationship function.

4. The method according to claim 3, the method further comprising:

obtaining a sample intra-domain feature representation of a sample user, the sample user corresponding to a sample cluster center, wherein the sample intra-domain feature representation of the sample user is extracted from second historical interaction data of the sample user in the first function platform;

obtaining third historical interaction data of the sample user in the second function platform, and extracting a feature based on the third historical interaction data, to obtain a sample extra-domain feature representation of the sample user;

obtaining a sample intra-domain mapping feature corresponding to the sample user, wherein the intra-domain mapping feature is based on mapping the sample extra-domain feature representation of the sample user with a candidate mapping function;

obtaining a reconstruction loss based on the sample intra-domain feature representation and the sample intra-domain mapping feature of the sample user; and training the candidate mapping function based on the reconstruction loss.

5. The method according to claim 1, further comprising:

performing clustering analysis on the second user based on the second feature representation, to obtain a plurality of clusters with a plurality of cluster centers, each cluster of the plurality of clusters including one cluster center of the plurality of cluster centers; and determining, based on similarity degrees between the first feature representation and the plurality of clusters, the cluster center of the plurality of cluster centers corresponding to the first user.

6. The method according to claim 5, wherein the performing the clustering analysis further comprises:

obtaining clustering information, the clustering information indicates position information of an initial cluster center;

obtaining a similarity degree between the second feature representation and the initial cluster center;

determining a first cluster distribution result based on the similarity degree between the second feature representation and the initial cluster center, the first cluster distribution result including a feature distribution corresponding to each initial cluster center; and performing discrete analysis on the first cluster distribution result, to obtain a second cluster distribution result; and determining the plurality of clusters based on the second cluster distribution result, the second cluster distribution result indicating each second feature representation with a corresponding cluster center.

7. The method according to claim 5, wherein the determining the cluster center of the plurality of cluster centers further comprises:

calculating a distance between the first feature representation and each cluster center of the plurality of clusters; and determining the cluster center of the plurality of cluster centers having a shortest distance as the cluster center corresponding to the first user.

8. The method according to claim 5, wherein the determining the cluster center of the plurality of cluster centers further comprises:

calculating the similarity degree between the first feature representation and each cluster center of the plurality of clusters;

determining, based on the similarity degrees, probabilities that the first user belongs to each cluster center; and determining, based on a maximum probability from the determined probabilities, the cluster center of the plurality of cluster centers having a shortest distance as the cluster center corresponding to the first user.

9. The method according to claim 1, wherein the obtaining the extra-domain feature representation further comprises:

determining, based on the first historical interaction data, a target heterogeneous graph including a plurality of meta-paths, and the target heterogeneous graph indicating a historical interaction relationship between the first user and a platform element in the second function platform; and obtaining the extra-domain feature representation of the first user based on path feature representations corresponding to the plurality of meta-paths.

10. The method according to claim 9, wherein the determining the target heterogeneous graph further comprises:

obtaining node attention of a path node in the meta-paths, the path node indicating the platform element having the historical interaction relationship with the first user; and performing aggregation processing on the node attention, to obtain the path feature representations of the meta-paths.

11. A content recommendation apparatus, comprising:

processing circuitry configured to:

obtain a first feature representation of a first user in a first function platform, wherein the first feature representation of the first user is extracted from attribute data of the first user;

obtain a second feature representation of a second user in the first function platform, wherein the second feature representation of the second user is extracted from attribute data of the second user;

determine a cluster center corresponding to the first user based on the first feature representation and the second feature representation;

obtain an extra-domain feature representation of the first user in a second function platform, wherein the extra-domain feature representation of the first user is extracted from first historical interaction data of the first user in the second function platform;

obtain a mapping relationship function corresponding to the cluster center, wherein the mapping relationship function indicates a feature representation relationship between the second function platform and the first function platform;

determine an intra-domain feature representation of the first user, wherein the intra-domain feature representation is based on mapping the extra-domain feature representation with the mapping relationship function;

determine a target feature representation of the first user based on the intra-domain feature representation and the first feature representation;

determine, from a candidate content recommendation pool, target content that matches the target feature representation of the first user; and push the target content to the first user.

12. The apparatus according to claim 11, wherein the processing circuitry is configured to:

perform parameter replacement on a pre-generated parameter-containing mapping function to obtain the mapping relationship function corresponding to the cluster center.

13. The apparatus according to claim 12, wherein the processing circuitry is configured to:

obtain the pre-generated parameter-containing mapping function, the pre-generated parameter-containing mapping function including a to-be-filled parameter position; and replace the cluster center with the to-be-filled parameter position to obtain the mapping relationship function.

14. The apparatus according to claim 13, wherein the processing circuitry is configured to:

obtain a sample intra-domain feature representation of a sample user, the sample user corresponding to a sample cluster center, wherein the sample intra-domain feature representation of the sample user is extracted from second historical interaction data of the sample user in the first function platform;

obtain third historical interaction data of the sample user in the second function platform, and extract a feature based on the third historical interaction data, to obtain a sample extra-domain feature representation of the sample user;

obtain a sample intra-domain mapping feature corresponding to the sample user, wherein the intra-domain mapping feature is based on mapping the sample extra-domain feature representation of the sample user with a candidate mapping function;

obtain a reconstruction loss based on the sample intra-domain feature representation and the sample intra-domain mapping feature of the sample user; and train the candidate mapping function based on the reconstruction loss.

15. The apparatus according to claim 11, wherein the processing circuitry is configured to:

perform clustering analysis on the second user based on the second feature representation, to obtain a plurality of clusters, each cluster of the plurality of clusters including one cluster center; and determine, based on similarity degrees between the first feature representation and the plurality of clusters, the cluster center of the plurality of cluster centers corresponding to the first user.

16. A non-transitory computer-readable storage medium, storing instructions which when executed by a processor cause the processor to perform:

obtaining a first feature representation of a first user in a first function platform, wherein the first feature representation of the first user is extracted from attribute data of the first user;

obtaining a second feature representation of a second user in the first function platform, wherein the second feature representation of the second user is extracted from attribute data of the second user;

determining a cluster center corresponding to the first user based on the first feature representation and the second feature representation;

obtaining an extra-domain feature representation of the first user in a second function platform, wherein the extra-domain feature representation of the first user is extracted from first historical interaction data of the first user in the second function platform;

obtaining a mapping relationship function corresponding to the cluster center, wherein the mapping relationship function indicates a feature representation relationship between the second function platform and the first function platform;

determining an intra-domain feature representation of the first user based on mapping the extra-domain feature representation with the mapping relationship function;

determining a target feature representation of the first user based on the intra-domain feature representation and the first feature representation;

determining, from a candidate content recommendation pool, target content that matches the target feature representation of the first user; and pushing the target content to the first user.

17. The non-transitory computer-readable storage medium according to claim 16, wherein the instructions when executed by the processor further cause the processor to perform:

performing parameter replacement on a pre-generated parameter-containing mapping function to obtain the mapping relationship function corresponding to the cluster center.

18. The non-transitory computer-readable storage medium according to claim 17, wherein the obtaining the mapping relationship function further comprises:

obtaining the pre-generated parameter-containing mapping function, the pre-generated parameter-containing mapping function includes a to-be-filled parameter position; and replacing the cluster center into the to-be-filled parameter position to obtain the mapping relationship function.

19. The non-transitory computer-readable storage medium according to claim 18, wherein the instructions when executed by the processor further cause the processor to perform:

obtaining a sample intra-domain feature representation of a sample user, the sample user corresponding to a sample cluster center, wherein the sample intra-domain feature representation of the sample user is extracted from second historical interaction data of the sample user in the first function platform;

obtaining third historical interaction data of the sample user in the second function platform, and extracting a feature based on the third historical interaction data, to obtain a sample extra-domain feature representation of the sample user;

obtaining a sample intra-domain mapping feature corresponding to the sample user, wherein the intra-domain mapping feature is based on mapping the sample extra-domain feature representation of the sample user with a candidate mapping function;

obtaining a reconstruction loss based on the sample intra-domain feature representation and the sample intra-domain mapping feature of the sample user; and training the candidate mapping function based on the reconstruction loss.

20. The non-transitory computer-readable storage medium according to claim 16, wherein the instructions when executed by the processor further cause the processor to perform:

performing clustering analysis on the second user based on the second feature representation, to obtain a plurality of clusters, each cluster of the plurality of clusters comprising one cluster center; and determining, based on similarity degrees between the first feature representation and the plurality of clusters, the cluster center corresponding to the first user.

* * * * *